(12) United States Patent
Hood et al.

(10) Patent No.: US 10,057,847 B2
(45) Date of Patent: Aug. 21, 2018

(54) QOS-BASED COOPERATIVE SCHEDULING FOR HANDLING OF DATA TRAFFIC

(71) Applicant: Telefonaktiebolaget L M Ericsson (publ), Stockholm (SE)

(72) Inventors: David Hood, Palo Alto, CA (US); Zhen Huang, Austin, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 419 days.

(21) Appl. No.: 14/426,934

(22) PCT Filed: Oct. 11, 2012

(86) PCT No.: PCT/SE2012/051087
§ 371 (c)(1),
(2) Date: Mar. 9, 2015

(87) PCT Pub. No.: WO2014/042570
PCT Pub. Date: Mar. 20, 2014

(65) Prior Publication Data
US 2015/0230169 A1   Aug. 13, 2015

Related U.S. Application Data

(60) Provisional application No. 61/701,082, filed on Sep. 14, 2012.

(51) Int. Cl.
*H04W 52/02* (2009.01)
*H04B 10/27* (2013.01)
(Continued)

(52) U.S. Cl.
CPC .. *H04W 52/0206* (2013.01); *H04B 10/25753* (2013.01); *H04B 10/27* (2013.01);
(Continued)

(58) Field of Classification Search
None
See application file for complete search history.

(56) References Cited

U.S. PATENT DOCUMENTS 6,763,195 B1   7/2004   Willebrand et al.
7,542,728 B2 *  6/2009   Bitran ............... H04B 7/026
                                                375/267
(Continued)

FOREIGN PATENT DOCUMENTS

EP        1 933 477 A1    6/2008
WO    WO 2008/036976 A2    3/2008
(Continued)

OTHER PUBLICATIONS

International Search Report, International Application No. PCT/SE2012/051087 dated Sep. 26, 2013, 5 pp.
(Continued)

*Primary Examiner* — Ayaz R Sheikh
*Assistant Examiner* — Tarell A Hampton
(74) *Attorney, Agent, or Firm* — Patent Portfolio Builders, PLLC

(57) ABSTRACT

Methods and related radio base stations (RBS) for handling data traffic are disclosed. The RBS is connected to a remote node via a wireless channel and to a centralized unit via a first channel. The traffic between the remote node and the centralized unit may be carried on the wireless or the first channel. The RBS receives information about quality and capacity of the wireless channel and information on quantity and priority of upstream data traffic waiting to be transferred from the remote node to the centralized unit. Based on the information, the RBS determines that at least part of the upstream data traffic from the remote node should be carried on the wireless channel.

31 Claims, 8 Drawing Sheets

PON Access network reference model

(51) Int. Cl.
*H04B 10/2575* (2013.01)
*H04W 28/02* (2009.01)
*H04L 12/12* (2006.01)
*H04L 12/26* (2006.01)

(52) U.S. Cl.
CPC .......... *H04L 12/12* (2013.01); *H04L 43/0882* (2013.01); *H04W 28/0236* (2013.01); *H04W 52/0216* (2013.01); *H04W 52/0219* (2013.01); *Y02D 70/00* (2018.01); *Y02D 70/1222* (2018.01); *Y02D 70/1262* (2018.01); *Y02D 70/1264* (2018.01); *Y02D 70/142* (2018.01); *Y02D 70/21* (2018.01); *Y02D 70/46* (2018.01)

(56) References Cited

U.S. PATENT DOCUMENTS

| | | | | |
|---|---|---|---|---|
| 2001/0013049 | A1* | 8/2001 | Ellis, III | G06F 9/5072 709/201 |
| 2005/0174935 | A1* | 8/2005 | Segel | H04L 45/22 370/228 |
| 2006/0221998 | A1 | 10/2006 | Livet et al. | |
| 2007/0076649 | A1* | 4/2007 | Lin | H04W 76/15 370/328 |
| 2007/0160014 | A1* | 7/2007 | Larsson | H04B 7/022 370/338 |
| 2008/0207230 | A1* | 8/2008 | Jung | H04W 76/046 455/458 |
| 2009/0219852 | A1* | 9/2009 | Youn | H04L 45/00 370/315 |
| 2010/0158525 | A1* | 6/2010 | Walter | H04L 12/2898 398/71 |
| 2013/0029589 | A1* | 1/2013 | Bontu | H04W 16/14 455/7 |

FOREIGN PATENT DOCUMENTS

| | | | |
|---|---|---|---|
| WO | WO 2011113202 A1 * | 9/2011 | ............ H04B 7/155 |
| WO | WO 2011/150986 A1 | 12/2011 | |
| WO | WO 2012/113841 A1 | 8/2012 | |
| WO | WO 2012/128697 A1 | 9/2012 | |

OTHER PUBLICATIONS

Written Opinion of the International Searching Authority, International Application No. PCT/SE2012/051087 dated Sep. 26, 2013, 9 pp.
Kantarci B. et al.: "Towards energy-efficient hybrid fiber-wireless access networks", 13*th* International Conference Transparent Optical Networks (ICTON); Jun. 26-30, 2011, Stockholm, Sweden; 4 pp.
Kantarci et al: "Power saving clusters for energy-efficient design of fiber-wireless access networks", 7th International Symposium on High-capacity Optical Networks and Enabling Technologies (HONET), Dec. 19-21, 2010, 73-78pp.
Chowdhury et al: "Building a Green Wireless-Optical Broadband Access Network (WOBAN)", Journal of Lightwave Technology, vol. 28, No. 16, Aug. 15, 2010, 2219-2229 pp.
IEEE Std 802.3-2012, IEEE Standard for Ethernet Section Five, Second Printing: Jun. 28, 2013; 844 pp.
ITU-T G.984.3 (Jan. 2014) "Gigabit-capable passive optical networks (G-PON): Transmission convergence layer specification" Series G: Transmission Systems and Media Digital Systems and Networks; Digital sections and digital line system—Optical line systems for local and access networks; International Telecommunication Union, 170 pp.
ITU-T G.987.3 (Jan. 2014) "10-Gigabit-capable passive optical networks (XG-PON): Transmission convergence (TC) layer specification" Series G: Transmission Systems and Media Digital Systems and Networks; Digital sections and digital line system—Optical line systems for local and access networks; International Telecommunication Union; 146 pp.

* cited by examiner

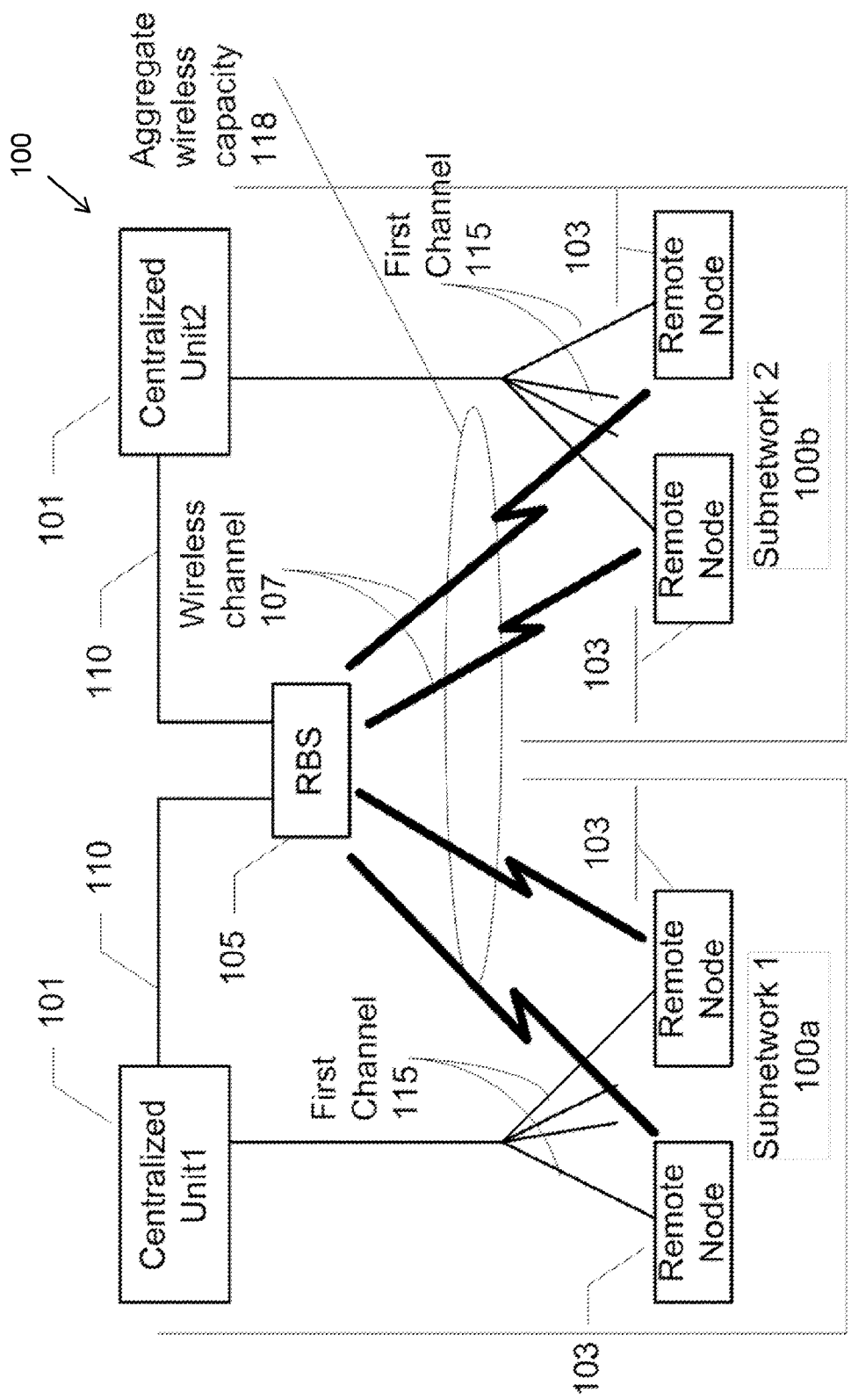
Figure 1 – Access network reference model

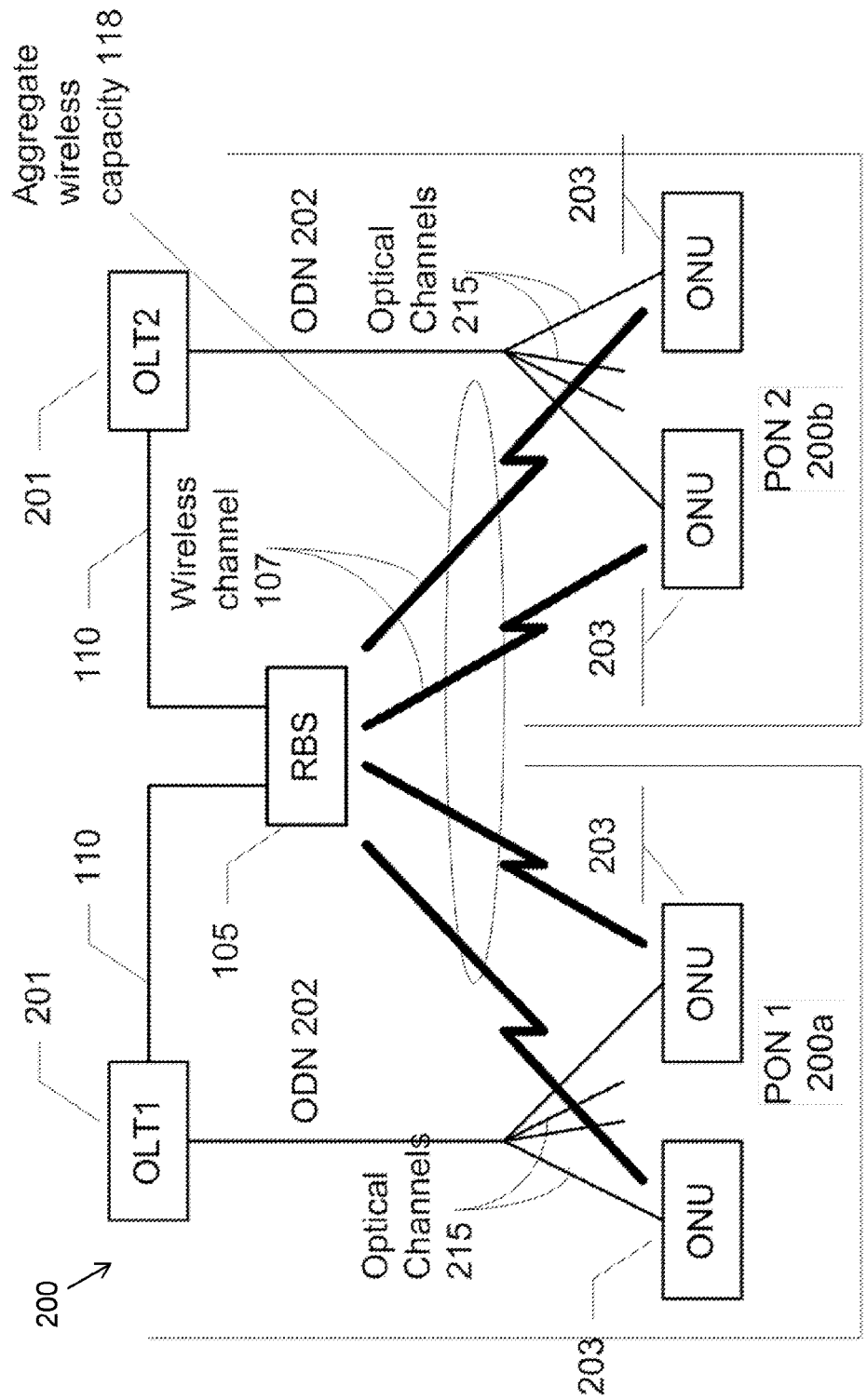
Figure 2 – PON Access network reference model

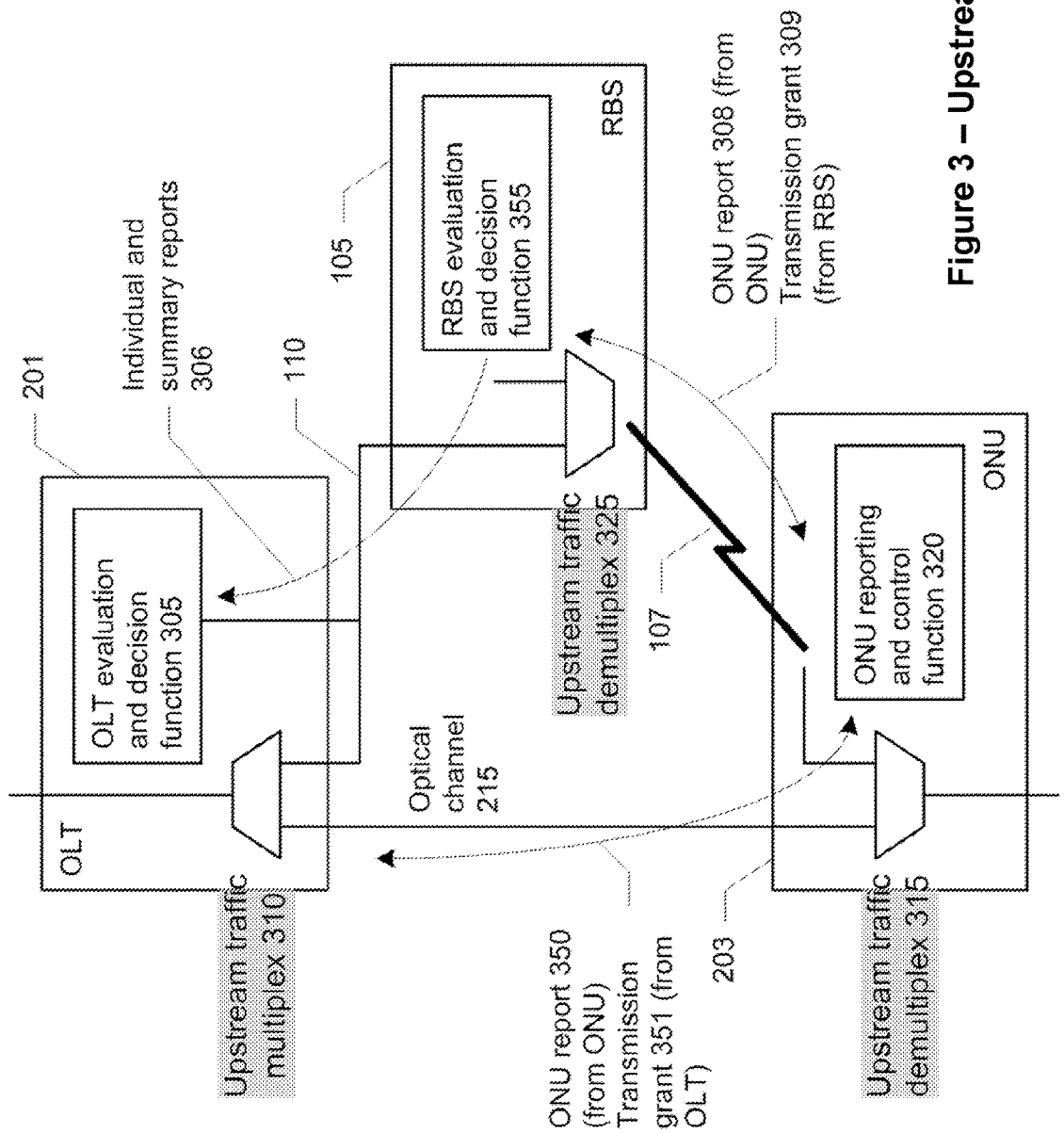
Figure 3 – Upstream flow detail

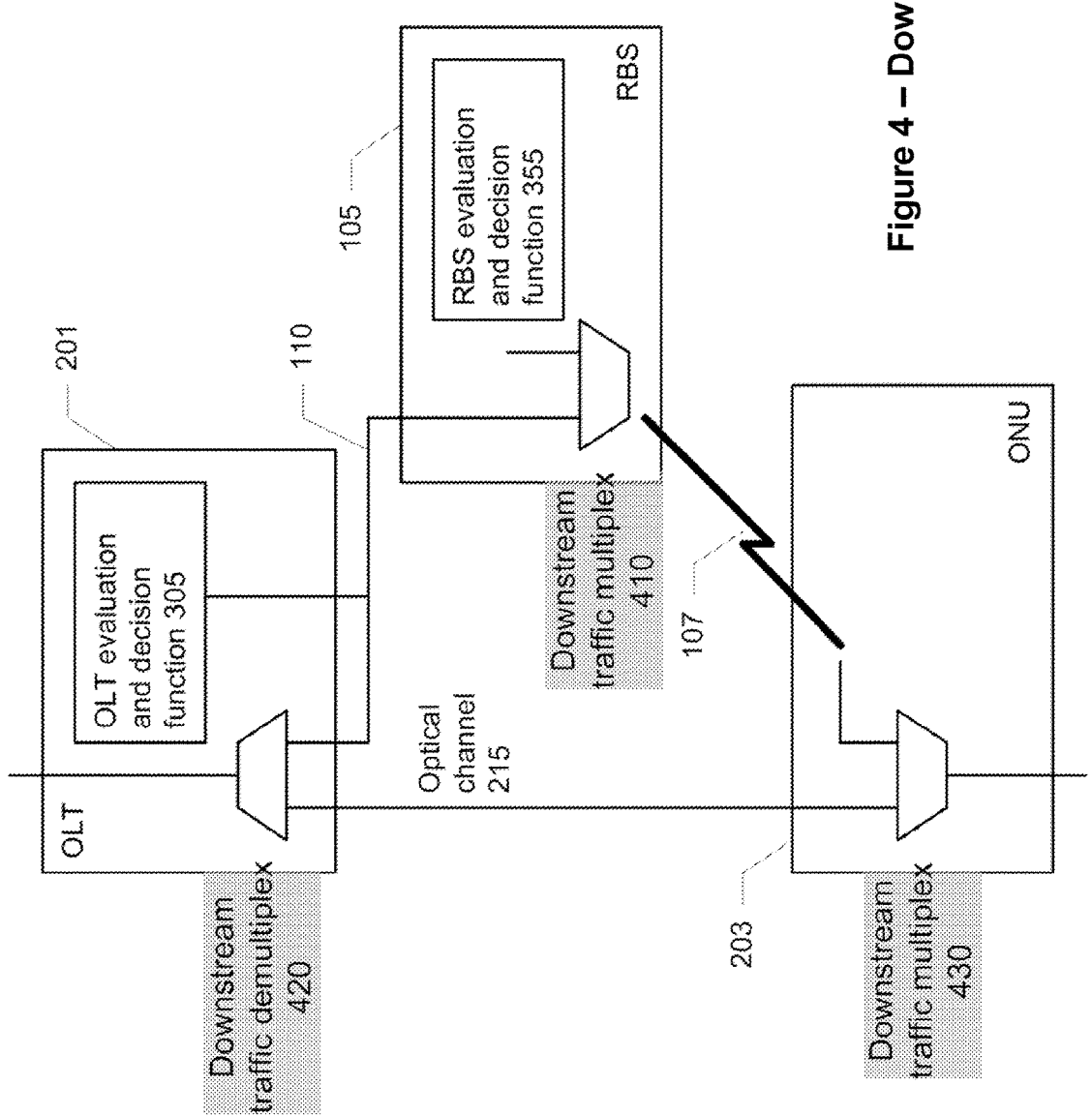
Figure 4 – Downstream flow detail

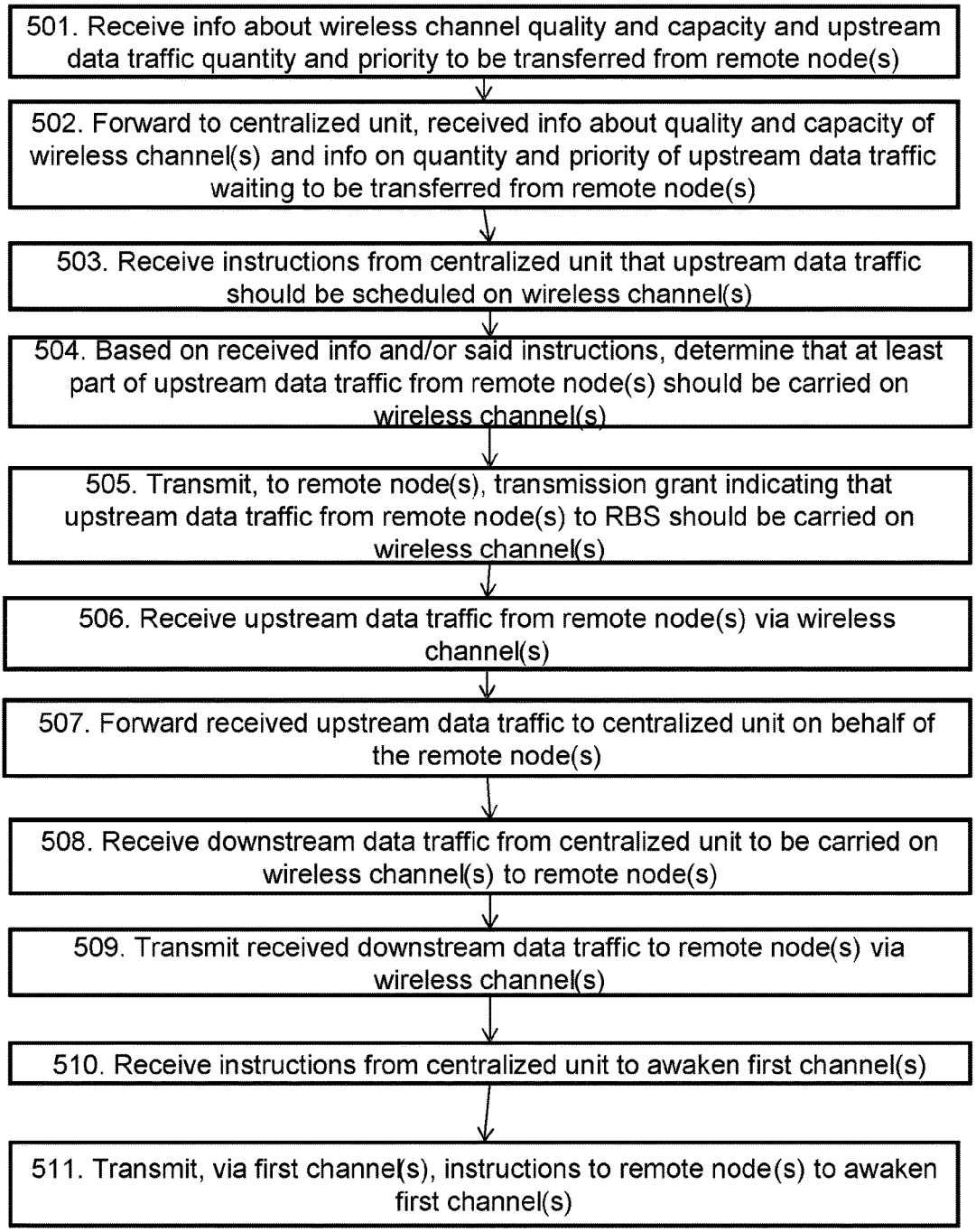
Figure 5 – Method in RBS

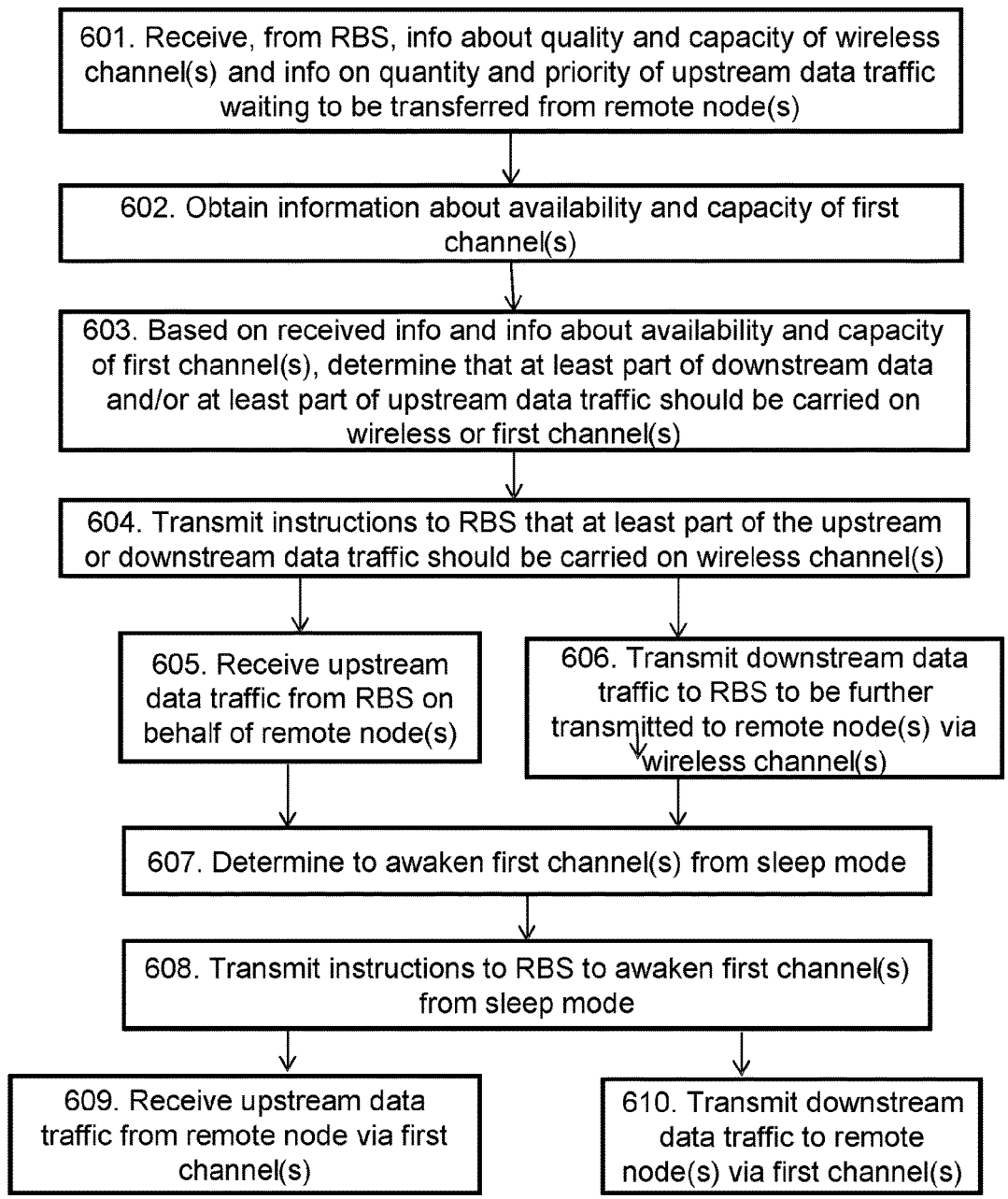
Figure 6 – Method in centralized unit

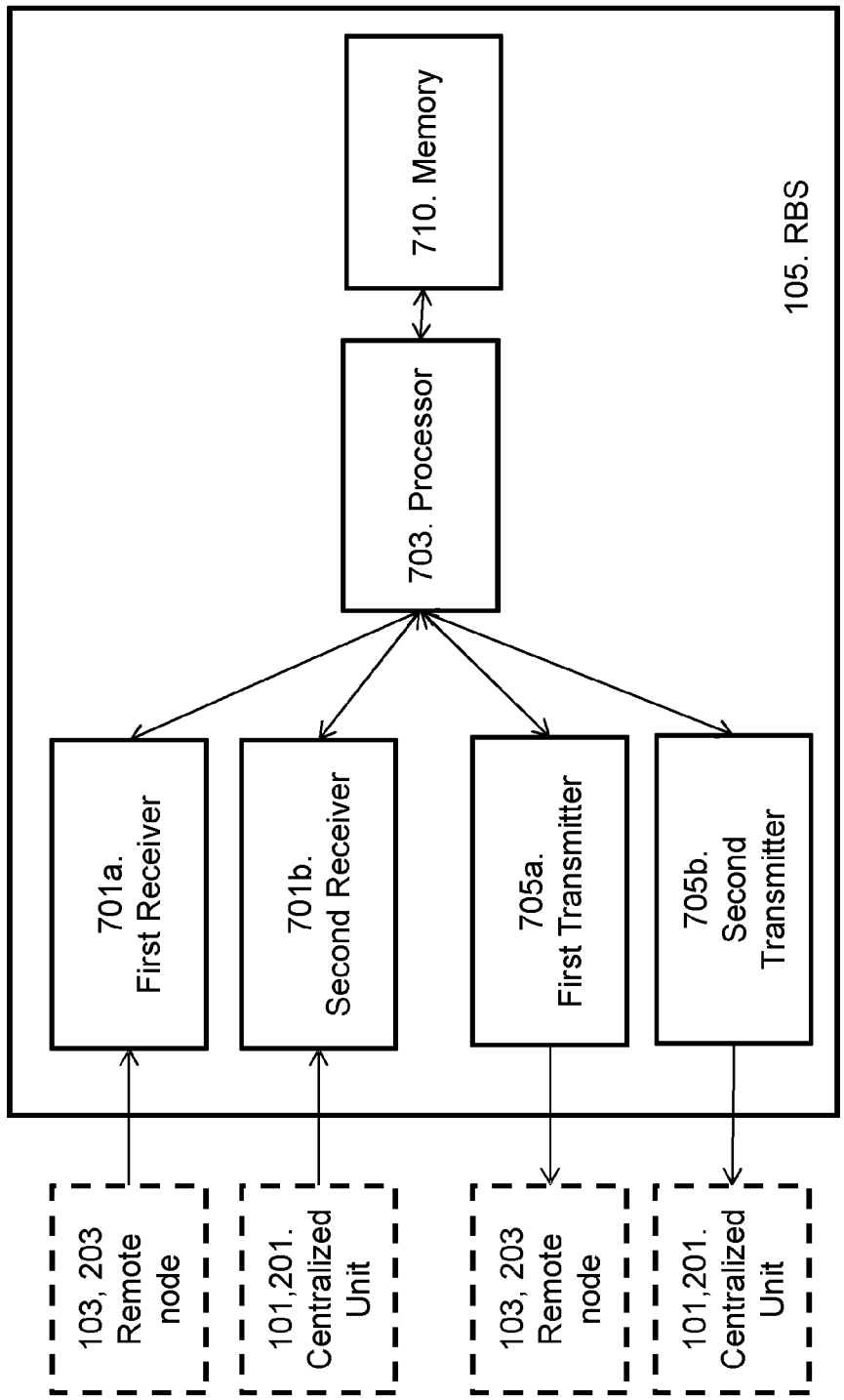
Figure 7 – RBS block diagram

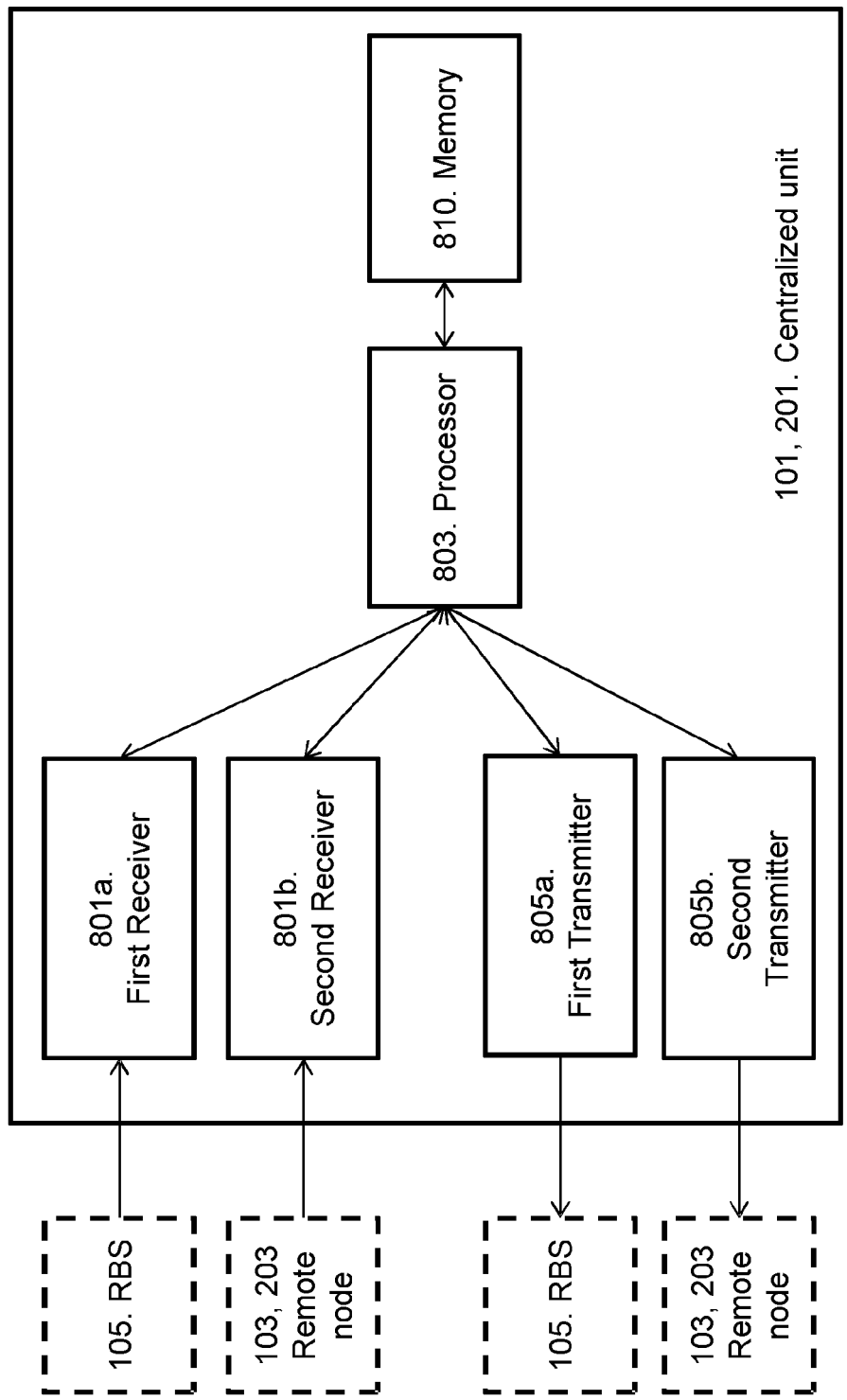
Figure 8 – Centralized unit block diagram

QOS-BASED COOPERATIVE SCHEDULING FOR HANDLING OF DATA TRAFFIC

CROSS REFERENCE TO RELATED APPLICATION

This application is a 35 U.S.C. § 371 national stage application of PCT International Application No. PCT/SE2012/051087, filed on 11 Oct. 2012, which itself claims the benefit of U.S. provisional Patent Application No. 61/701,082, filed 14 Sep. 2012, the disclosures and contents of both of which are incorporated by reference herein in their entirety. The above-referenced PCT International Application was published in the English language as International Publication No. WO 2014/042570 A1 on 20 Mar. 2014.

TECHNICAL FIELD

Embodiments herein relate generally to a radio base station, a method in the radio base station, a centralized unit and a method in the centralized unit. More particularly the embodiments herein relate to handling data traffic in a communications network.

BACKGROUND

In a typical communications network, also referred to as e.g. a network, a system or a communication system, a centralized unit, located at a central location, e.g. a service provider central office, is connected to one or more remote nodes. More than one remote node may be connected to the same centralized unit by means of passive or in some cases, active, intermediate elements. The remote node(s) is located apart from the centralized unit and may be seen as an endpoint in a point-to-multipoint network. The centralized unit may be represented by e.g. an Optical Line Terminal (OLT) or an aggregation switch, where the term aggregation indicates that a plurality of remote nodes is connected to the aggregation switch.

An access network is that part of a communications network that connects a remote node(s) to its immediate service provider. It is contrasted with the core network. The core network is the central part of the communications network, which provides various services to the remote node(s) that are connected by the access network. In e.g. a Passive Optical Network (PON), downstream signals, i.e. from the centralized unit to the remote node(s), are broadcast to all remote nodes sharing a single communications channel. In other (non-PON) access networks, there may be a dedicated channel, e.g. fibre, microwave or copper Digital Subscriber Line (DSL), between each remote node and the centralized node. Upstream signals are signals transmitted from the remote node(s) to the centralized unit.

The remote node(s) may be a device by which a subscriber may access services offered by an operator's network and services outside the operator's network to which the operator's access network and core network provide access, e.g. access to the Internet.

The remote node(s) may be any device, enabled to communicate over a channel in the communications network, for instance but not limited to e.g. user equipment, sensors, meters, household appliances, medical appliances, media players, cameras, Machine to Machine (M2M) device, Optical Network Unit (ONU), Digital Subscriber Line Access Multiplexer (DSLAM), radio terminal or any type of consumer electronic, for instance but not limited to television, radio, lighting arrangements, tablet computer, laptop or Personal Computer (PC).

The remote node(s) is enabled to communicate with the network, wirelessly or wired.

When the remote nodes are wirelessly connected, the network may cover a geographical area which may be divided into cell areas, and is therefore called a cellular network. Each cell area is served by a Radio Base Station (RBS), which sometimes may be referred to as e.g. base station, evolved Node B (eNB), eNodeB, NodeB, B node, or Base Transceiver Station (BTS), depending on the technology and terminology used. The radio base station is designated RBS in some of the drawings.

An example of a communications network will now be described. The communications network may be a PON which is a point-to-multipoint network architecture that brings optical fiber cabling and signals all or most of the way to the end remote node(s). A PON comprises an OLT i.e. the centralized unit, at a service provider's Central Office (CO) and a number of ONUs near end users, i.e. remote node(s). More than one ONU may be connected to the same OLT by means of passive or in some cases, active, intermediate elements. For example, up to 32 ONUs may be connected to an OLT. PONs are called passive because optical transmission requires no power or active electronic components. In other words, other than at the central office and subscriber endpoints, there are typically no active electronics within a PON access network. Downstream signals, i.e. from the OLT to the ONU, are broadcast to all ONUs sharing a single trunk fiber. Upstream signals are signals transmitted from the ONU to the OLT.

An ONU is a device that converts incoming downstream optical signals transmitted from the OLT via a wireline fiber optical communications channel, referred to as an optical channel, into electrical signals. An ONU comprises an optical transceiver for the transmission of optical signal upstream on the optical channel. The ONU may also be called an Optical Network Terminal (ONT), which is a special case of an ONU that serves a single subscriber.

As mentioned above, the ONU is used in combination with the OLT. The OLT performs conversion between the electrical signals used by the service provider's equipment and the fiber optic signals used by the PON. The OLT coordinates the multiplexing between the ONUs at or near the various subscriber locations.

Other ways to arrange an access network include, by way of example and not limitation, the interconnection of centralized terminals such as Ethernet aggregation switches to remote devices such as digital subscriber line access multiplexers (DSLAMs) by dedicated fibre optic links, digital subscriber lines (DSL), terrestrial microwave links or otherwise.

Energy conservation in communications networks is an important issue. Potential solutions to improve energy conservation through reduced power consumption within optical access networks have been explored. These solutions may have impact on improving the equipment performance and service longevity in battery-powered operation, as well as on energy conservation and $CO_2$ emission in general.

The term power refers to the ability to do work on a continuing bases, while the term energy is a measure of the amount of work done during an interval, that is, power*time. Therefore, energy may be saved or conserved, while power may be reduced. Throughout the industry, the term power is commonly used to refer to both. It is to be understood in the following description that terms such as power saving imply power reduction for a period of time, with the purpose of energy saving.

A current power saving mode conserves energy by implementing sleep cycles to power off one or both directions of the transceiver in the remote node(s) at certain times. Thus, at any given time, the transceiver, and hence the communications channel to the centralized unit (e.g. an OLT), may be in a so-called sleep mode or so-called awake mode, and it may use a wake-up timer to change between the modes. In order to support remote node(s) wake-up, sleep cycles are provisioned by the centralized unit, typically in the order of 10-100 milliseconds. Only when the sleep cycle expires, does a sleeping remote node(s) have the chance to wake up to receive downstream data traffic. When there is no downstream data traffic to a sleeping remote node(s), the remote node(s) still has to be awakened when the wake-up timer expires, i.e. when the sleep interval expires. Frequently turning the transceiver in the remote node(s) on and off contributes to extra power consumption. When there is downstream data traffic destined to the remote node(s), and the remote node(s) is still in sleep mode, the centralized node has to buffer the data traffic until the wake-up timer expires. The necessary buffer memory adds cost and power consumption to the centralized unit, and may degrade the end user's quality of service. In the following, the term sleep mode is used in relation to a remote node, a transceiver, a transmitter, a receiver, a communications channel, or a remote node's communication interface, while still referring to the same scenario. All of these usages refer to the case when a remote node's communication interface, i.e. the optics and possibly some part of the electronics are in sleep mode. The consequence of this is that the communication is unavailable, or sleeping, in at least one direction, depending on whether the remote node's transmitter or receiver or both, is powered down.

Another power saving mode is power shedding, in which non-essential services are switched off when the remote node(s) goes into battery operation mode after e.g. a commercial power failure. Power shedding is intended to reduce the demand for battery power and prolong the survival time of the remote node(s), while still maintaining lifeline Plain Old Telephone Service (POTS). The current definition of power shedding mode still maintains the transceiver on, while just powering down other selected elements in the remote node(s). However, one of the main power consumption contributors in the remote node(s) is the optical transceiver module. Additional energy may be saved by combining power shedding with sleep mode.

It will be appreciated that delay, buffer memory and service quality issues encourage sleep cycles to be as short as possible, while energy conservation would be better achieved if it were possible to extend sleep cycles, possibly indefinitely.

Referring to the example of the PON, the embodiments herein describe a PON ONU that also comprises a wireless interface device, and in which the wireless channel(s) is used to allow the ONU to better conserve energy by sleeping while at the same time providing better service than would be possible without the wireless channel(s). The embodiments herein take advantage of the fact that radio technology, e.g. as used in the cellular network, is far more efficient in its use of remote node battery power than is possible with current fiber optic or DSL interface technology. The sleeping ONU(s) sends and receives status reports about data traffic arrival and other significant events (such as the need for control or management transactions or alarm reports) by way of its wireless channel(s), allowing the relatively power-hungry optical interface to remain powered down.

Further, control and management data traffic or bearer data traffic may be exchanged over the wireless channel(s), in lieu of the optical channel, under various circumstances, such as light data traffic load or failure of the optical channel, but also conditioned on the relative data traffic load of the wireless channel(s). The evaluation and decision logic may be a functional component in the PON OLT.

In a plurality of telecommunications passive optical networks, each PON comprises a tree-structured fiber optical distribution network with an optical line termination at the head end and a plurality of optical network units, one at each leaf of the tree. Although described in PON terms, the embodiments herein are also suitable for direct point-to-point channels between the centralized unit and the remote unit(s).

It may be assumed that the OLT and the ONUs support energy conservation measures. In such sleep modes, the ONU powers down part or all of its transceiver from time to time, and is consequently temporarily incapable of transmitting upstream data traffic, or receiving downstream data traffic, or both, on its fiber optical interface. The ONU may awaken from sleep mode under the control of a timer, because of local circumstances such as the arrival of upstream data traffic, or, when the ONU is capable of receiving it, a wakeup command from the OLT.

In the embodiments herein, it is assumed that the ONU(s) is further equipped with a wireless radio interface that is capable of communicating with a nearby radio base station via a wireless channel(s). The radio base station is understood to serve ONUs that are members of possibly more than one PON, and may serve other data traffic as well, for example from cell phones in its vicinity (not shown in the figures).

The radio base station is equipped with a communications channel to each OLT whose ONUs it serves. The channel has sufficiently large capacity and sufficiently low delay to not constrain the functions described herein.

As described above, existing embodiments represent a tradeoff between the cost and power of buffer memory, user quality of experience, and energy conservation, in which at least one of these factors is likely to be at least somewhat unsatisfactory.

SUMMARY

An objective of embodiments herein is therefore to obviate at least one of the above disadvantages and to provide improved handling of data traffic in a communications network by simultaneously providing one or more of reduced latency, better end-user experience, improved conveyance of management and alarm information, and reduced energy consumption.

According to a first aspect, the object is achieved by a method in a radio base station for handling data traffic in a communications network. The radio base station is connected to a remote node(s) via a wireless channel(s). The remote node(s) is connected to a centralized unit via a first channel(s). The data traffic between the remote node(s) and the centralized unit may be carried on either the wireless channel(s) or the first channel(s). The radio base station receives, from the remote node, information about quality and capacity of the wireless channel(s) and information on quantity and priority of upstream data traffic waiting to be transferred from the remote node(s) to the centralized unit. Based on the received information, the radio base station determines that at least part of the upstream data traffic from the remote node(s) should be carried on the wireless channel(s).

According to a second aspect, the object is achieved by a method in a centralized unit for handling data traffic in a communications network. The centralized unit is connected to a remote node(s) via a first channel(s). The centralized unit is connected to a radio base station. The radio base station is connected to the remote node(s) via a wireless channel(s). The data traffic between the remote node(s) and the centralized unit may be carried over either the wireless channel(s) or the first channel(s). The centralized unit receives, from the radio base station, information about quality and capacity of the wireless channel(s) individually and in the aggregate, and information on quantity and priority of upstream data traffic waiting to be transferred from the remote node(s). Based on received information and information about availability and capacity of the first channel(s), the centralized unit determines that at least part of the downstream data traffic to the remote node(s) and/or least part of the upstream data traffic from the remote node(s) should be carried on the wireless channel(s) or the first channel(s).

According to a third aspect, the object is achieved by a radio base station for handling data traffic in a communications network. The radio base station is arranged to be connected to a remote node(s) via a wireless channel(s). The remote node(s) is arranged to be connected to a centralized unit via a first channel(s). The data traffic between the remote node(s) and the centralized unit may be carried on either the wireless channel(s) or the first channel(s). The radio base station comprises a first receiver which is configured to receive, from the remote node(s) information about quality and capacity of the wireless channel(s) and information on quantity and priority of upstream data traffic waiting to be transferred from the remote node(s) to the centralized unit. The radio base station comprises a processor configured to, based on the received information, determine that at least part of the upstream data traffic from the remote node(s) should be carried on the wireless channel(s).

According to a fourth aspect, the object is achieved by a centralized unit for handling data traffic in a communications network. The centralized unit is arranged to be connected to a remote node(s) via a first channel(s). The centralized unit is arranged to be connected to a radio base station. The radio base station is arranged to be connected to the remote node(s) via a wireless channel(s). The data traffic between the remote node(s) and the centralized unit may be carried over either the wireless channel(s) or the first channel(s). The centralized unit comprises a first receiver which is configured to receive, from the radio base station, information about quality and capacity of the wireless channel(s), individually and in the aggregate, and information on quantity and priority of upstream data traffic waiting to be transferred from the remote node(s). The centralized unit comprises a processor which is configured to, based on the received information and information about availability and capacity of the first channel(s), determine that at least part of the downstream data traffic to the remote node(s) and/or least part of the upstream data traffic from the remote node(s) should be carried on the wireless channel(s) or the first channel(s).

According to a fifth aspect, the object is achieved by a computer program stored in a computer readable memory in a radio base station for handling data traffic in a communications network. The radio base station is arranged to be connected to a remote node(s) via a wireless channel(s). The remote node is arranged to be connected to a centralized unit via a first channel(s). The data traffic between the remote node(s) and the centralized unit is arranged to be carried on either the wireless channel(s) or the first channel(s). The computer program comprising instruction sets for receiving, from the remote node(s), information about quality and capacity of the wireless channel(s) and information on quantity and priority of upstream data traffic waiting to be transferred from the remote node(s) to the centralized unit. The computer program comprises instructions sets for, based on the received information, determining that at least part of the upstream data traffic from the remote node(s) should be carried on the wireless channel(s).

According to a sixth aspect, the object is achieved by a computer program stored in a computer readable memory in a centralized unit for handling data traffic in a communications network. The centralized unit is arranged to be connected to a remote node(s) via a first channel(s). The centralized unit is arranged to be connected to a radio base station. The radio base station is arranged to be connected to the remote node(s) via a wireless channel(s). The data traffic between the remote node(s) and the centralized unit is arranged to be carried over either the wireless channel(s) or the first channel(s). The computer program comprising instruction sets for receiving, from the radio base station, information about quality and capacity of the wireless channel(s) and information on quantity and priority of upstream data traffic waiting to be transferred from the remote node(s). The computer program comprises instruction sets for, based on the received information and information about availability and capacity of the first channel(s), determining that at least part of the downstream data traffic to the remote node(s) and/or least part of the upstream data traffic from the remote node(s) should be carried on the wireless channel(s) or the first channel(s).

Since the information about the wireless channel(s) and the first channel(s) and information about waiting upstream data traffic is used to select the wireless channel(s) or the first channel(s), handling of the data traffic in the communications network is improved.

Embodiments herein afford many advantages, of which a non-exhaustive list of examples follows:

An advantage of the embodiments herein is that the data traffic performance is optimized. While permitting the interfaces of remote node(s) to remain asleep perhaps indefinitely, an additional advantage of saving additional energy is obtained.

Another advantage of the embodiments herein is that they provide remote access for alarm and diagnosis to a remote node(s) whose first channel may have degraded or failed.

Another advantage is that wireless technology combined with sleep cycles allows joint optimization of QoS and energy conservation, as a function of wireless network load and data traffic volume and priority.

Furthermore, an advantage of the embodiments herein is that they facilitate better decisions on the part of the radio base station and the centralized unit about which channel (first or wireless) to use for which data traffic, and whether or not to awaken the remote node(s). The evaluation of time-varying wireless channel characteristics and traffic load permits the optimal use of valuable radio capacity, including assigning priority to ordinary cell phone traffic so that the wireless channel is preferably used for traffic from the remote node only when the aggregate wireless capacity is not congested.

Other advantages are that the embodiments herein improve the user experience and they reduce buffer memory requirements in the network nodes.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 1 is a schematic block diagram illustrating embodiments of a communications network.

FIG. 2 is a schematic block diagram illustrating embodiments of a PON network.

FIG. 3 is a schematic block diagram illustrating embodiments of an upstream flow method.

FIG. 4 is a schematic block diagram illustrating embodiments of a downstream flow method.

FIG. 5 is a flow chart illustrating embodiments of a method in a radio base station.

FIG. 6 is a flow chart illustrating embodiments of a method in a centralized unit.

FIG. 7 is a schematic block diagram illustrating embodiments of a radio base station.

FIG. 8 is a schematic block diagram illustrating embodiments of a centralized unit.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein add an evaluation function to the radio base station, which radio base station receives reports relating to the quality and capacity of the wireless channel(s) from the remote node(s), along with reports on queued upstream data traffic volume and priority, which may comprise control and management transactions and alarm reports. This facilitates better decisions on the part of the radio base station and the centralized unit about which channel (wireless or first channel(s)) to use for which data traffic, and whether or not to awaken the first channel(s).

FIG. 1 depicts a communications network 100 in which embodiments herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology, or other radio access technologies such as e.g. Wireless Local Area Network (WLAN, also known as Wi-Fi). The communications network 100 may be divided into a number of subnetworks, such as the first subnetwork 100a and the second subnetwork 100b. Each subnetwork has a tree-structured distribution network with a centralized unit 101 at the head end and at least one remote node 103 at the leaves of the tree. Even though FIG. 1 shows four remote nodes 103 as an example, the skilled reader will understand that any number of remote nodes 103 is applicable.

The centralized unit 101 may be for example an OLT, and/or an aggregation switch. Further, the said distribution network may be an optically split tree or a plurality of direct links, one to each remote node. Such direct links may be implemented with optical, copper (e.g. DSL), microwave or other technology.

The remote node(s) 103 may be any device, enabled to communicate over the first channel 115, for instance but not limited to e.g., sensors, meters, vehicles, household appliances, medical appliances, media players, Machine to Machine (M2M) devices, ONUs, DSLAMs, radio terminals, cameras, or any type of consumer electronic, for instance but not limited to television, radio, lighting arrangements, tablet computer, laptop, or PC.

The remote node(s) 103 is further equipped with a wireless radio interface that is capable of communicating with a nearby radio base station 105 via a respective wireless channel 107. The radio base station 105 is understood to serve a plurality of remote node(s) 103 that are members of possibly more than one subnetwork, e.g. the first subnetwork 100a and the second subnetwork 100b in the example of FIG. 1, and may serve other data traffic as well, for example from cell phones in its vicinity (not shown). The radio base station 105 may be a base station such as a NodeB, an eNB, or any other network unit capable to communicate over the wireless channel 107 with at least one remote node 103. As FIG. 1 is exemplified with four remote nodes 103, the FIG. 1 also shows four wireless channels 107. However, the skilled reader will understand that the number of remote nodes 103 and wireless channels 107 may be any suitable number from one and up.

The radio base station 105 is equipped with a communications channel 110 to each centralized unit 101 whose remote node(s) 103 it serves. The communications channel 110 has sufficiently large capacity and sufficiently low delay to not constrain the functions described herein. At least part of the communications channel 110 may be wireless or wireline.

A first channel 115 is provided between the centralized unit 101 and the remote node(s) 103. In some embodiments, at least part of the first channel(s) 115 is a wireless channel. In some embodiments, at least part of the first channel(s) 115 is a wireline channel. The term link may also be used to refer to the same feature as a channel. The first channel(s) 115 may be for example an optical fiber cable or a microwave channel. The first channel(s) 115 is a channel where there is enough power consumed by the interface that it is worth putting the interface into low-power modes when possible. The first channel(s) 115, when it is awake, has far greater capacity and lower cost per bit than the wireless channel(s) 107. The first channel(s) 115 may be seen as a high-capacity channel when available. As FIG. 1 is exemplified with four remote nodes 103, the FIG. 1 also shows four first channels 115. However, the skilled reader will understand that the number of remote nodes 103 and first channels 115 may be any suitable number from one and up.

The centralized unit 101 and the remote node(s) 103 may support energy conservation measures such as sleep modes. In such sleep modes, the remote node(s) 103 powers down part or all of its transceiver from time to time, and is consequently temporarily incapable of transmitting upstream data traffic, or receiving downstream data traffic, or both, on its first channel interface. The remote node(s) 103, i.e. the first channel(s) interface of the remote node(s) 103, may awaken from sleep mode under the control of a timer, because of local circumstances such as the arrival of upstream data traffic from a user port, or, when the remote node(s) 103 is capable of receiving it, a wakeup command from the centralized unit 101. It will be appreciated that, when the remote node's downstream receiver is powered down, it is incapable of receiving a wakeup command by way of the first channel 115. In a sleep mode, the first channel(s) 115 is unavailable in one or both directions from time to time. In this text, the term sleep means that the first channel(s) 115 may be disabled from time to time, possibly for energy conservation reasons, and that the term awakening refers to restoring the first channel(s) 115 to a serviceable state.

The radio base station 105 has a bounded aggregate wireless data traffic capacity 118 associated with the plurality of wireless channels 107, and including other wireless clients such as cell phones (not shown), determined by radio effects such as fading and multipath interference. It will be appreciated that the aggregate wireless data traffic capacity 118 varies with time, and that spare data traffic capacity is therefore a time-varying function of the aggregate wireless data traffic capacity 118, as well as of the data traffic carried at any given time. Further, the capacity available on any individual wireless channel 107 varies in a way that is at least partly independent from the variability of other wireless channels 107. A radio base station 105 optimizes the overall capacity of the wireless network 118 by exploiting the best individual wireless channels 107 as they vary over time.

For purposes of this description, the data traffic and messages conveyed across the communications network 100 comprise the following:

From the centralized unit 101 downstream to the remote node(s) 103, bearer data traffic, also sometimes known as payload. Conceptually, this data traffic is ultimately delivered to telecommunications subscribers. It may comprise several streams at differing priorities and differing volumes and arrival rates.

From the centralized unit 101 downstream to the remote node(s) 103, control and management data traffic. This may be unidirectional data traffic, or may represent the downstream direction of a transaction. Such data traffic is usually informative only, and repeated on a regular basis, in which case it may be regarded as low priority data traffic, or else it represents an intentional management operation, in which case it is normally regarded as high priority data traffic. One particular message in the high priority class is the wakeup command directed to a sleeping remote node(s) 103.

From the remote node(s) 103 upstream to the centralized unit 101, bearer data traffic, likewise with variable volume, arrival rates and priority.

From the remote node(s) 103 upstream to the centralized unit 101, control and management data traffic and autonomous notifications of events such as alarms. All of this data traffic is normally considered to be high priority.

The above described data traffic may flow between the centralized unit 101 and the remote node(s) 103 via the first channel(s) 115, or via the wireless channel(s) 107, the latter path using the radio base station 105 as a relay node. The choice of channel depends on the quality and capacity of the individual 107 and aggregate 118 wireless links, the priority and quantity of information to be exchanged between the remote unit and the centralized unit, and the availability and capacity, e.g. due to sleep mode, of the first channel 115.

The centralized unit 101 and the remote node(s) 103 also exchange information and control messages with the radio base station 105. Some of these messages are described in greater detail below:

From time to time, the remote node(s) 103 estimates the quality of the wireless channel(s) 107, using information such as received signal strength, signal to noise ratio and error rate. It reports the quality of the wireless channel(s) 107 to the radio base station 105 in for example Channel Status Information (CSI) reports. A remote node(s) 103 may be capable of evaluating the quality of the wireless channel(s) 107, as it changes in time. When wireless channel(s) quality is reported to a radio base station 105 by a number of remote node(s) 103 and other wireless clients such as cell phones (not shown), the radio base station 105 may be able to schedule transmission grants from the various devices to maximize the aggregate transmission capacity 118 from the plurality of remote node(s) 103 and other wireless clients.

As part of an extended channel status information report, or as a separate report, the remote node(s) 103 reports quantity and priority of its queued upstream data traffic. This information is similar to, and may be identical to, the queue backlog reports used for Dynamic Bandwidth Assignment (DBA), as specified by e.g. the International Telecommunications Union's Telecommunication Standardization Sector (ITU-T).

From time to time, the radio base station 105 reports to each of its associated centralized units 101 the channel status of each of that centralized unit's 101 remote node(s) 103 that may be in sleep mode, along with that remote node(s)' 103 queued upstream data traffic report. The radio base station 105 also reports an estimate of the aggregate available capacity 118 in its overall load.

Finally, the centralized unit 101, the radio base station 105 and the remote node(s) 103 may exchange low-level information directly related to the operation of their respective interconnecting physical channels, for example remote node(s) 103 time-slot bandwidth allocation on the first channel(s) 115, which may meaningfully flow only over the physical channel concerned. Such information is recognized in this description, but is not considered further, as it is not material to the embodiments herein.

Said with other words, the centralized unit 101 controls whether the first channel(s) 115 is in sleep mode, cooperatively with the remote node(s) 103. When it deems appropriate, the centralized unit 101 sends a command to awaken a sleeping first channel(s) 115 to the remote node(s) 103 via the radio base station 105. The centralized unit 101 determines whether the volume or priority of downstream data traffic, or other factors, justify awakening a sleeping first channel(s) 115. The centralized unit 101 determines whether downstream data traffic should be directed to the remote node(s) 103 via the radio base station 105 or via an (awake) first channel(s) 115, and multiplexes the downstream traffic onto the appropriate channel. The centralized unit 101 accepts upstream data traffic from the remote node(s) 103 via either the (awake) first channel(s) 115 or the radio base station 105. The centralized unit 101 may establish a delegation policy in the radio base station 105 authorizing the radio base station 105 to grant upstream capacity to the remote node(s) 103 for specified quantities and priorities of upstream data traffic.

The radio base station 105 accepts the channel status reports and data traffic backlog reports from at least the remote node(s) 103 with sleeping first channel(s) 115 (possibly from all remote nodes 103, but when so, then comprising information about first channel(s) sleep mode, as another decision factor). The radio base station 105 reports individual remote node(s) information and aggregate available wireless capacity 118 to the centralized unit 101. The radio base station 105 receives instruction from the centralized unit 101 whether to awaken the first channel(s) 115, via the wireless channel(s) 107, and executes the instruction accordingly. The radio base station 105 may receive instruction dynamically from the centralized unit 101 whether to grant upstream data traffic capacity to the remote node(s) 103, and how much capacity. The centralized unit 101 may also, or in addition, establish a policy in the radio base station 105, whereby the radio base station 105 is delegated the authority to carry a certain priority or quantity of upstream data traffic from a remote node(s) 103, especially during the interval required to awaken the remote node(s)' 103 first channel(s) 115. When a policy has been established in the radio base station 105 by the centralized unit 101, the radio base station 105 evaluates CSI and data traffic backlog reports from the remote node(s) 103 and grants upstream capacity accordingly according to its own evaluation. It would be expected that the policy would establish maximum bounds on upstream data traffic, which might be dynamically reduced by the radio base station 105 on the basis of channel quality or congestion from another remote node(s) 103 or from other wireless clients of the radio base station 105.

The remote node(s) 103 cooperates with the centralized unit 101 to control the sleep mode of the first channel(s) 115. In some embodiments, this cooperation occurs via the first channel(s) 115 itself. In some embodiments, sleep mode entry or exit may be controlled, at least in part, by messages conveyed via the radio base station 105 and the wireless channel(s) 107. From time to time, when the first channel(s) 115 is asleep, or at any time, the remote node(s) 103 reports channel status information and upstream data traffic backlog information to the radio base station 105 via the wireless channel(s) 107. The remote node(s) 103 directs upstream data traffic to one of the (awake) first channel(s) 115 or the wireless channel(s) 107, according to grants received from the centralized unit 101 or radio base station 105, respectively. The remote node(s) 103 accepts and multiplexes downstream data traffic received via either the first channel(s) 115 or the wireless channel(s) 107.

The communications network 100 in FIG. 1 will now be described using an example where the communications network 100 is a PON network 200, as seen in FIG. 2, in which embodiments herein may be implemented. The PON network 200 may be divided into a number of subnetworks, such as the first PON 200*a* and the second PON 200*b*. Each subnetwork has a tree-structured Optical Distribution Network (ODN) 202 with an OLT 201, i.e. the centralized unit 101, at the head end and a plurality of ONUs 203, i.e. remote nodes 103, at the leaves of the tree. In this example network, the first channel(s) 115 is represented by an optical channel(s) 215, i.e. a wireline channel(s). The ODN 202 comprises the optical channel(s) 215, where each ONU 203 is connected to at least one optical channel 215. Even though FIG. 2 shows four ONUs 203, the skilled reader will understand that any number of ONUs 203 is applicable.

The ONU(s) 203 is further equipped with wireless radio interfaces that are capable of communicating with a nearby radio base station 105 via the wireless channel(s) 107. The radio base station 105 is understood to serve a plurality of ONU(s) 203 that are members of possibly more than one subnetwork, e.g. the first PON 200*a* and the second PON 200*b* in the example of FIG. 2, and may serve other data traffic as well, for example from cell phones in its vicinity (not shown). The radio base station 105 may be a base station such as a NodeB, an eNB, or any other network unit capable to communicate over the wireless channel(s) 107 with at least one ONU 203.

The radio base station 105 is equipped with a communications channel 110 to each centralized unit 101 whose ONU 203 it serves. The communications channel 110 has sufficiently large capacity and sufficiently low delay to not constrain the functions described herein, and at least part of the communications channel 110 may be wireless or wireline.

The OLT 201 and the ONU 203 may support energy conservation measures such as sleep modes. In such sleep modes, the ONU 203 powers down part or all of its transceiver from time to time, and is consequently temporarily incapable of transmitting upstream data traffic, or receiving downstream data traffic, or both, on its fiber optical interface. The ONU 203 may awaken from sleep mode under the control of a timer, because of local circumstances such as the arrival of upstream data traffic from a subscriber port, or, when the ONU 203 is capable of receiving it, a wakeup command via the optical channel 215 from the OLT 201. In embodiments described herein, a sleeping ONU 203 may also be awakened by a wakeup command from the OLT 201 relayed by the radio base station 105 by way of the wireless channel 107.

The radio base station 105 has a bounded aggregate wireless capacity 118, determined by radio effects such as fading and multipath interference. It will be appreciated that the individual wireless channel 107 capacity varies with time and therefore that the aggregate wireless capacity 118 varies with time, and that spare wireless capacity is therefore a time-varying function of the aggregate wireless capacity 118, as well as of the data traffic carried at any given time.

The method for handling data traffic in a communications network 100, 200, according to some embodiments will now be described with reference to the more detailed functional diagram depicted in FIG. 3 and using the PON network 200 as an example network. The skilled reader will understand that FIG. 3 is applicable to any other type of communications network in addition to a PON. FIG. 3 illustrates the upstream flow, i.e. from the ONU 203 to the OLT 201.

The ONU 203 comprises a reporting and control function 320 which is configured to create reports from time to time, relating to quality and capacity of the wireless channel(s) 107. The radio base station 105 comprises an evaluation and decision function 355, whereby the radio base station 105 receives reports relating to quality and capacity of the wireless channel(s) 107, e.g. CSI reports, from the ONU(s) 203, along with reports on queued upstream data traffic volume and priority, which comprise subscriber traffic, control and management transactions and alarm reports. The quality and capacity report and the upstream data traffic report from a given ONU 203 may be separate, or may be combined into a single composite report message. These options are combined in FIG. 3, as upstream ONU report 308. The ONU 203 is equipped with an upstream data traffic demultiplex function 315, that accepts upstream data traffic to be transmitted to the OLT 201.

Having received, via the wireless channel(s) 107, such an ongoing stream of ONU reports 308, from the single ONU 203 exemplified in FIG. 3 and from the plurality of other ONUs 203 in its domain (not shown), as well as channel status reports from other wireless clients such as cell phones (not shown), the radio base station 105 is in a position to evaluate the relative priority of upstream transmission requests and the time-varying channel capacity of each ONU's 203 upstream channel, and to grant upstream capacity over the wireless channel(s) 107 in an optimum way by way of timely transmission grants 309 to each ON U 203. By way of example and not limitation, such an algorithm might unconditionally grant capacity to a limited quantity of high priority data traffic, but then trade off capacity grants for larger volumes of high priority data traffic against lower priority data traffic in proportion to momentary individual and aggregate channel capacity, possibly in a weighted fashion.

When the radio base station 105 grants upstream wireless capacity to the ONU 203, by sending the transmission grant 309 to the ONU 203, the radio base station 105 is then responsible to forward this data traffic to the OLT 201 on behalf of the ONU 203, via the communication channel 110. The radio base station 105 is equipped with an upstream demultiplex function 325, that accepts upstream data traffic from the ONU over the wireless channel(s) 107. The purpose of the demultiplex function 325 in FIG. 3 is to recognize that the radio base station 105 may simultaneously accept upstream traffic destined to a plurality of OLTs 201 (not shown) or other traffic such as cellular radio traffic (not shown). The OLT 201 is equipped with an upstream data traffic multiplex function 310 that accepts upstream data traffic either from the ONU 203 over the optical channel 215 or from the radio base station 105 over the communication channel 110.

The radio base station 105 may also forward to the OLT 201 the wireless channel(s) status for each of the OLT's ONU(s) 203, and an estimate of the radio base station's 105 current free data traffic capacity 118, considering channel quality and its total data traffic load. In FIG. 3, this is shown as the individual and summary reports 306.

A cooperating evaluation and decision function 305 in the OLT 201 accepts this status information.

The ONU report 350 (from the ONU 203) and the transmission grant 351 (from the OLT 201) relates to operation on a PON that uses the optical channel 215 for at least part of the traffic.

In the upstream direction, the decision to admit data traffic from the ONU 203 on the wireless channel(s) 107 is made by the radio base station 105 on the basis of considerations described above. Although the decision is ultimately made by the radio base station 105, upstream traffic decision criteria may be established as a policy downloaded from the OLT 201 into the radio base station 105, or may be established on a continuing basis from time to time by the OLT's evaluation, in block 305, of the upstream individual and summary reports 306. When the ONU 203 is sleeping, it cannot send any upstream data traffic on the optical channel 215, and the OLT 201 need merely multiplex data traffic 310 relayed from the radio base station 105 into its normal upstream data flow.

As well as channel status information reports, the ONU 203 may originate alarm reports, comprising by way of example and not limitation, alarms relating to the degradation or failure of its optical channel 215, along with pertinent diagnostic data. Based on its own local considerations, the ONU 203 may also signal a request by way of the wireless channel(s) 107 that the OLT 201 awaken the ONU(s)' optical channel 107.

This, along with any other control, management and alarm traffic that may be part of the upstream flow, as relayed over the communications channel 110 by the radio base station 105, terminates in the OLT's 201 evaluation and decision function 305, where it may be used to evaluate whether the OLT 201 should awaken the sleeping ONU(s) 203 or perform other functions such as alarm forwarding to an external Element Management System (EMS) or Network Management System (NMS). From time to time, the OLT's 201 evaluation and decision function 305 may direct the radio base station 105 on near-term or longer-term policy regarding which traffic from which ON U(s) 203 should be forwarded via the wireless channel 107.

FIG. 4 illustrates the downstream direction. In the downstream direction, the OLT 201 monitors arriving data traffic quantity and priority, as destined to each of its particular ONU(s) 203. The OLT 201 may also have control or management data traffic to forward to a given ONU 203, either originated by itself or on behalf of external entities such as a management system (EMS or NMS). Based on downstream data traffic and control and management data traffic priority and quantity, as well as the channel status of the ONU(s) 203, the OLT 201 may determine to send at least some of the data traffic to a sleeping ONU(s) 203 by way of the radio base station 105. The OLT 201 may also send a wake-up request to the sleeping ONU(s) 203 by way of the radio base station 105.

In the downstream direction, the ONU(s) 203 simply multiplexes data traffic, by using a downstream data traffic multiplexer 430, that it receives from either of its optical channel 215 or wireless channel(s) 107 interfaces. The OLT 201 comprises a downstream data traffic demultiplexer 420 that demultiplexes the downstream data traffic intended for the ONU 203 to one or the other of the chosen routes. The radio base station 105 comprises a downstream data traffic multiplexer 410 that multiplexes the data traffic to be sent on the wireless channel(s) 107 to the ONU(s) 203.

The above descriptions of FIGS. 3 and 4 are based on the assumption that the remote node(s) 103, 203 is in sleep mode, and that data traffic may be carried through the wireless channel(s) 107 instead of awakening the remote node(s) 103, 203.

However, the embodiments described herein may also be used for remote node(s) 103, 203 that is fully awake and active. According to some embodiments, a remote node(s) 103, 203 continues to send quality and capacity reports 308 to the radio base station 105 even when awake. The radio base station 105 and the centralized unit 101, 201 negotiate to direct some or all data traffic flows over the wireless channel(s) 107 or the first channel(s) 115, 215 depending on data traffic volume, priority, channel characteristics and aggregate spare first channel(s) capacity. This has the potential to alleviate data traffic bottlenecks in the network 100, 200.

In some embodiments, the wireless channel(s) 107 is used for the exchange of alarm, test and diagnostic information, particularly as related to the interfaces of the remote node(s) 103, 203 to the first channel(s) 115, 215.

In a further embodiment, the centralized unit 101, 201 may be for example any centralized aggregation equipment unit, where the term aggregation indicates that a plurality of remote nodes 103, 203 is connected to the aggregation equipment unit. The remote node(s) 103, 203 may any be any remote terminal devices with corresponding shared or dedicated backhaul interfaces 115, 215, 202 and wireless interfaces 107. By way of example and not limitation, such remote node(s) 103, 203 may be DSLAMs or small cell radio terminals adapted to comprise wireless interfaces 107. The first channel(s) 115, 215 may referred to as a backhaul channel and it may be replaced by any channel whose interfaces consume enough power (and provide correspondingly higher capacity) to justify a power down mode under light load or fault conditions. By way of example and not limitation, such channels may comprise IEEE 802.1 or Common Public Radio Interface (CPRI) payloads over Digital Subscriber Line (DSL), microwave or point-to-point fibre. The embodiments herein support these options by offering a low-power, and comparatively low-capacity wireless channel(s) 107 that may be used to control the power-down state of the high-capacity backhaul channel 115, 215, and may be used to carry limited amounts of bearer data traffic in lieu of powering up the backhaul channel.

Summarized, the embodiments herein relate to a network 100, 200 in which the decision to forward downstream data traffic over the first channel(s) 115, 215 or the wireless channel(s) 107 is determined by the centralized unit 101, 201 at least in part on the basis of the spare capacity currently available on the associated aggregated wireless channels 118 or the available individual wireless channel(s) 107 capacity of the target remote unit 103, 203. Certain data traffic flows may be directed through the wireless channel(s) 107, even for remote node(s) 103, 203 that are fully awake and active. Remote node alarm, test or diagnosis information may be directed through the wireless channel(s) 107. The remote centralized unit 101 and the remote node(s) 103, 203 are of any communications technology, with the first channel(s) 115, 215 of any correspondingly supported technology.

The method described above will now be described seen from the perspective of the radio base station 105. FIG. 5 is a flowchart describing the present method in the radio base station 105, for handling data traffic in the communications network 100, 200. As mentioned above, the radio base station 105 is connected to a remote node 103, 203 via a wireless channel 107. In some embodiments, the radio base station 105 is connected to a plurality of remote nodes 103, 203 via a plurality of first channels 107. The remote node 103, 203 is connected to a centralized unit 101, 201 via a first channel 115, 215. The data traffic between the remote node(s) 103, 203 and the centralized unit 101, 201 may be carried on either the wireless channel(s) 107 or the first channel(s) 115, 215.

In some embodiments, at least part of the first channel(s) 115, 215 is a wireless channel or a wireline channel. The wireline channel may be represented by a shared or point-to-point optical fibre channel, and/or a DSL and/or a microwave channel.

The remote node(s) 103, 203 may be represented by an ONU and/or a Digital Subscriber Line Access Multiplexer (DSLAM) and/or a radio terminal. The centralized unit 101, 201 may be represented by an OLT and/or an aggregation switch.

The method comprises the following steps to be performed by radio base station 105, which steps may be performed in any suitable order:

Step 501

This step corresponds to step 308 in FIG. 3.

The radio base station 105 receives, from the remote node(s) 103, 203 information about quality and capacity of the wireless channel(s) 107, and information on quantity and priority of upstream data traffic waiting to be transferred from the remote node(s) 103, 203 to the centralized unit 101, 201. The radio base station 105 evaluates the received information, and when the radio base station 105 is connected to a plurality of remote nodes 103, 203 it aggregates the reports, along with information about overall channel quality and load from other wireless clients (not shown) into a summary 118.

The information about the quality and capacity of the wireless channel(s) 107 may be a CSI, report comprising received signal strength, signal to noise ratio, error rate of the wireless channel(s) 107. The information about the upstream data traffic may comprise quantity, and priority of the queued upstream data traffic.

The information may be received from time to time, i.e. with a predetermined time interval, continuously, or upon request from the radio base station 105.

Step 502

This step corresponds to step 306 in FIG. 3.

In some embodiments, the radio base station 105 forwards, to the centralized unit 101, 201, the received information about quality and capacity of the wireless channel(s) 107 and the information on quantity and priority of upstream data traffic waiting to be transferred from the remote node(s) 103, 203. This enables the centralized unit 101, 201 to determine that at least part of the upstream data traffic should be carried on the wireless channel(s) 107. In some embodiments, the information 118 about quality and capacity of the plurality of wireless channels 107 is also forwarded to the centralized unit 101, 201, e.g. in an aggregate report. This enables the centralized unit 101, 201 to further optimize the decision of how much upstream traffic to carry over the wireless channel(s) 107.

Step 503

In some embodiments, the radio base station 105 receives instructions from the centralized unit 101, 201 that at least part of the upstream data traffic should be carried on the wireless channel(s) 107. If it is determined that only part of the upstream data traffic is to be carried on the wireless channel(s) 107, the remaining part of the data traffic may be discarded in the remote node(s) 103, 203, or may be buffered by the remote node(s), pending a subsequent opportunity to transmit, either over the wireless channel 107 or the first channel 115, 215.

The received instructions may be in the form of a non-real-time policy setting operation. During operation, the radio base station 105 does not know/care about the first channel(s) 115, 215, just whether or not to use the wireless channel(s) 107.

Step 504

Based on the received information, the radio base station 105 determines that at least part of the upstream data traffic from the remote node(s) 103, 203 should be carried on the wireless channel(s) 107. In some embodiments, the decision is further based on the instructions received in step 503. In some embodiments, the decision is further based on information 118 about quality and capacity of the plurality of wireless channels 107. The decision may also be based on a policy. In FIG. 3, the decision is illustrated to be performed by the RBS evaluation and decision function 355.

Step 505

In some embodiments, the radio base station 105 transmits, to the remote node(s) 103, 203, a transmission grant 309 indicating that at least part of the upstream data traffic from the remote node(s) 103, 203 to the centralized unit 101, 201 should be carried on the wireless channel(s) 107.

Step 506

In some embodiments, the radio base station 105 receives the upstream data traffic from the remote node(s) 103, 203 via the wireless channel(s) 107.

Step 507

In some embodiments, the radio base station 105 forwards the received upstream data traffic to the centralized unit 101, 201 on behalf of the remote node(s) 103, 203, using the channel 110.

Step 508

In some embodiments, the radio base station 105 receives downstream data traffic from a centralized unit 101, 201 to be carried on the wireless channel(s) 107 to the remote node(s) 103, 203.

Step 509

In some embodiments, the radio base station 105 transmits the received downstream data traffic to the remote node(s) 103, 203 via the wireless channel(s) 107.

Step 510

In some embodiments, the radio base station 105 receives instructions from the centralized unit 101, 201 to awaken the first channel(s) 115, 215 from a sleep mode. The instruction to awaken the first channel(s) 115, 215 goes via the radio base station 105 and the wireless channel(s) 107 when the first channel(s) 115, 215 is asleep downstream.

Step 511

In some embodiments, based on received awake instructions, the radio base station 105 transmits, via the wireless channel(s) 107, the instructions to the remote node(s) 103, 203 to awaken the first channel(s) 115, 215.

The method described above will now be described seen from the perspective of the centralized unit 101, 201. FIG. 6 is a flowchart describing the present method in the centralized unit 101, 201, for handling data traffic in the communications network 100, 200. As mentioned above, the centralized unit 101, 201 is connected to a remote node(s) 103, 203 via a first channel(s) 115, 215. The centralized unit 101, 201 is connected to a radio base station 105. The radio base station 105 is connected to the remote node(s) 103, 203 via a wireless channel(s) 107. The data traffic between the remote node(s) 103, 203 and the centralized unit 101, 201 may be carried over either the wireless channel(s) 107 or the first channel(s) 115, 215. In some embodiments, the radio base station 105 is connected to a plurality of remote nodes 103, 203 via a plurality of first channels 107. In some embodiments, the centralized unit 101, 201 is connected to a plurality of remote nodes 103, 203 via a plurality of first channels 115, 215.

In some embodiments, at least part of the first channel(s) 115, 215 is a wireless channel or a wireline channel. The wireline channel may be represented by a shared or point-to-point optical fibre channel and/or a DSL and/or a microwave channel.

In some embodiments, the remote node(s) 103, 203 is represented by an ONU and/or a DSLAM and/or a radio terminal. In some embodiments, the centralized unit 101, 201 is represented by an OLT and/or an aggregation switch.

The method comprising the following steps, which steps may be performed in any suitable order:

Step 601

The centralized unit 101, 201 receives, from the radio base station 105, information about quality and capacity of the wireless channel(s) 107 and information on quantity and priority of upstream data traffic waiting to be transferred from the remote node(s) 103, 203. In some embodiments, the centralized unit 101, 201 further receives information 118 about quality and capacity of the plurality of wireless channels 107.

Step 602

In some embodiments, the centralized unit 101, 201 obtains information about the availability and capacity of the first channel(s) 115, 215. The centralized unit 101, 201 may obtain the information by for example evaluating its current energy conservation sleeping state, by assessing the service or maintenance state of the first channel(s) 115, 215, by evaluating congestion in the current traffic load on the first channel(s) 115, 215, or otherwise.

Step 603

This step is performed by the evaluation and decision functional block 305.

Based on the received information and information about availability and capacity of the first channel(s) 115, 215, the centralized unit 101, 201 determines that at least part of the downstream data traffic to the remote node(s) 103, 203 and/or least part of the upstream data traffic from the remote node(s) 103, 203 should be carried on the wireless channel(s) 107 or on the first channel(s) 115, 215. In some embodiments, the decision is further based on information 118 about availability and capacity of the plurality of first channels 115, 215.

The choice of channel for downstream data traffic is under the control of the centralized unit 101, 201, not the radio base station 105. The radio base station 105 may cooperate as a relay station for data traffic sent from the centralized unit 101, 201 through the radio base station 105 via the wireless channel(s) 107, but use of the first channel(s) 115, 215 is wholly the centralized unit's 101 decision and control.

Also, the radio base station 105 is not concerned with scheduling data traffic on the first channel(s) 115, 215. When the radio base station 105 does not carry the data traffic itself, it becomes the centralized unit's 101 responsibility to deal with the first channel(s) 115, 215 including possibly awakening it. Awakening a sleeping first channel 115, 215 may, however, necessitate using the radio base station 105 and the wireless channel 107 as a communications path.

The centralized unit 101, 201 specifically determines which downstream channel to use, but in the downstream direction, the centralized unit 101, 201 may just send the downstream data traffic on whichever channel it chooses, expecting the radio base station 105 to forward it. An explicit instruction implies an additional message or negotiation, and may not be needed.

The decision is based on any or all of: individual wireless quality and capacity, aggregate wireless capacity, data traffic backlog and priority, availability of the first channel 115, 215. The available capacity of the first channel(s) 115, 215 may change as a function of traffic load, so the decision may also be based on the congestion of the first channel(s) 115, 215.

Step 604

In some embodiments, when at least part of the upstream data traffic or the downstream data traffic is determined to be carried on the wireless channel(s) 107, the centralized unit 101, 201 transmits instructions to the radio base station 105 that the upstream data traffic or the downstream data traffic should be carried on the wireless channel(s) 107.

In the case where the centralized unit 101, 201 does not send the instructions to the radio base station 105, the centralized unit 101, 201 does not perform step 604 but goes directly to step 606 where the downstream data traffic is transmitted. As was explained previously, the centralized unit 101, 201 may still receive upstream traffic from the radio base station 105, said traffic having been received by the radio base station 105 acting according to the directives of a policy, rather than a real-time message.

Step 605

In some embodiments, the centralized unit 101, 201 receives the upstream data traffic from the remote node(s) 103, 203. The upstream data traffic is transmitted from the remote node(s) 103, 203 to the radio base station 105 via the wireless channel(s) 107 and forwarded by the radio base station 105 on behalf of the remote node 103, 203.

Step 606

In some embodiments, the centralized unit 101, 201 transmits the downstream data traffic to the radio base station 105 to be further transmitted to the remote node(s) 103, 203 via the wireless channel(s) 107.

Step 607

In some embodiments, when at least part of the upstream data traffic or the downstream data traffic is determined to be carried on the first channel(s) 115, 215, or for other reasons, the centralized unit 101, 201 determines to awaken the first channel(s) 115, 215 from a sleep mode.

Step 608

In some embodiments, the centralized unit 101, 201 transmits instructions to the radio base station 105 to awaken the first channel(s) 115, 215 from the sleep mode. If the first channel(s) 115, 215 is already awake, the centralized unit 101, 201 proceeds directly to step 609 and/or 610.

Step 609

In some embodiments, the centralized unit 101, 201 receives the upstream data traffic from the remote node(s) 103, 203 via the first channel(s) 115, 215.

Step 610

In some embodiments, the centralized unit 101, 201 transmits the downstream data traffic to the remote node(s) 103, 203 via the first channel(s) 115, 215.

To perform the method steps shown in FIG. 5 for handling data traffic in a communications network 100, 200 the radio base station 105 comprises an arrangement as shown in FIG. 7. As mentioned above, the radio base station 105 is arranged to be connected to a remote node 103, 203 via a wireless channel 107. The remote node 103, 203 is arranged to be connected to a centralized unit 101, 201 via a first channel 115, 215. The data traffic between the remote node 103, 203 and the centralized unit 101, 201 may be carried on either the wireless channel 107 or on the first channel 115, 215. In some embodiments, the radio base station 105 is arranged to be connected to a plurality of remote nodes 103, 203 via a plurality of wireless channels 107. In some embodiments, at least part of the first channel(s) 115, 215 is a wireless channel or a wireline channel. The wireline channel may be represented by an optical fibre channel and/or a DSL and/or a microwave channel and/or a point-to-point fibre channel. The remote node(s) 103, 203 may be represented by an ONU and/or a DSLAM and/or a radio terminal. The centralized unit 101, 201 may be represented by an OLT and/or an aggregation switch.

The radio base station 105 may comprise a first receiver 701a and a first transmitter 705a both facing the remote node(s) 103, 203, i.e. the wireless channel(s) 107. The radio base station 105 may further comprise a second receiver 701b and a second transmitter 705b both facing the centralized unit 101, 201, i.e. the communications channel 110.

The first receiver 701a is configured to receive, from the remote node(s) 103, 203 information about quality and capacity of the wireless channel(s) 107 and information on quantity and priority of upstream data traffic waiting to be transferred from the remote node(s) 103, 203 to the centralized unit 101, 201. In some embodiments, the first receiver 701a is further configured to receive the at least part of the upstream data traffic from the remote node(s) 103, 203 via the wireless channel(s) 107.

The second receiver 701b may be configured to receive instructions from a centralized unit 101, 201 that at least part of the upstream data traffic should be scheduled on the wireless channel(s) 107. The second receiver 701b may be further configured to receive downstream data traffic from the centralized unit 101, 201 to be carried on the wireless channel(s) 107 to the remote node(s) 103, 203. In some embodiments, the second receiver 701b is further configured to receive instructions from the centralized unit 101, 201 to awaken the first channel(s) 115, 215.

In some embodiments, the first transmitter 705a is further configured to transmit, to the remote node(s) 103, 203, a transmission grant 309 indicating that at least part of the upstream data traffic from the remote node(s) 103, 203 to the radio base station 105 should be carried on the wireless channel(s) 107. The first transmitter 705a may be further configured to transmit the received downstream data traffic to the remote node(s) 103, 203 via the wireless channel(s) 107. In some embodiments, the first transmitter 705a is configured to, based on received awake instructions, transmit, via the wireless channel(s) 107, the instructions to the remote node(s) 103, 203 to awaken the first channel(s) 115, 215.

The second transmitter 705b may be configured to forward, to the centralized unit 101, 201, the received information about quality and capacity of the wireless channel(s) 107 and the information on quantity and priority of upstream data traffic waiting to be transferred from the remote node(s) 103, 203. This enables the centralized unit 101, 201 to determine that at least part of the upstream data traffic should be carried on the wireless channel(s) 107. The second transmitter 705b may be configured to forward the at least part of the received upstream data traffic to the centralized unit 101, 201 on behalf the remote node(s) 103, 203. In some embodiments, the second transmitter 705b is further configured to forward the information 118, about quality and capacity of the plurality of first channels 107 to the centralized unit 101, 201.

The radio base station 105 further comprises a processor 703 which is configured to, based on the received information, determine that at least part of the upstream data traffic from the remote node(s) 103, 203 should be carried on the wireless channel(s) 107. In some embodiments, the processor 703 is further configured to determine that at least part of the upstream data traffic should be carried on the wireless channel(s) 107 further based on the received instructions. In some embodiments, the processor 703 is further configured to determine that at least part of the upstream data traffic from the remote node(s) 103, 203 should be carried on the wireless channel(s) 107 further based on information 118 about quality and capacity of the plurality of wireless channels 107. The evaluation and decision function 355 shown in FIGS. 3 and 4 is comprised in the processor 703.

The radio base station 105 may further comprise a memory 710 comprising one or more memory units. The memory 710 may also be referred to as a computer readable memory 710. The memory 710 is arranged to be used to store data, received data streams, power level measurements, threshold values, time periods, configurations, schedulings, information about quality and capacity of the wireless channel(s) 107 and information on quantity and priority of upstream data traffic waiting to be transferred from the remote node(s) 103, 203 to the centralized unit 101, 201, decisions, instructions, transmission grant, upstream data traffic, downstream data traffic, awake instructions and computer program(s) to perform the methods herein when being executed in the radio base station 105.

Those skilled in the art will also appreciate that the first receiver 701a, the second receiver 701b, the first transmitter 705a and the second transmitter 705b described above may refer to a combination of analog and digital circuits, and/or one or more processors configured with software and/or firmware, e.g. stored in the memory 710, that when executed by the one or more processors such as the processor 703 perform as described above.

In FIG. 7, the dotted boxes illustrates to which network node the entities in the radio base station 105 communicates with.

To perform the method steps shown in FIG. 6 for handling data traffic in a communications network 100, 200, the centralized unit 101, 201 comprises an arrangement as shown in FIG. 8. As mentioned above, the centralized unit 101, 201 is arranged to be connected to a remote node(s) 103, 203 via a first channel(s) 115, 215. The centralized unit 101, 201 is arranged to be connected to a radio base station 105. The radio base station 105 is arranged to be connected to the remote node(s) 103, 203 via a wireless channel 107. The data traffic between the remote node(s) 103, 203 and the centralized unit 101, 201 may be carried over either the wireless channel 107 or the first channel(s) 115, 215. In some embodiments, the radio base station 105 is arranged to be connected to a plurality of remote nodes 103, 203 via a plurality of wireless channels 107. The centralized unit 101, 201 may be arranged to be connected to a plurality of remote nodes 103, 203 via a plurality of first channels 115, 215. In some embodiments, at least part of the first channel(s) 115, 215 is a wireless channel or a wireline channel. The wireline channel may be represented by an optical fibre channel and/or a DSL and/or a microwave channel and/or a point-to-point fibre channel. The remote node(s) 103, 203 may be represented by an ONU and/or a DSLAM and/or a radio terminal. The centralized unit 101, 201 may be represented by an OLT and/or an aggregation switch.

The centralized unit 101, 201 may comprise a first receiver 801a and a first transmitter 805a both facing the radio base station 105, i.e. the communications channel 110. The centralized unit 101, 201 may further comprise a second receiver 801b and a second transmitter 805b both facing the remote node(s) 103, 203, i.e. the first channel(s) 115, 215.

The first receiver 801a is configured to receive, from the radio base station 105, information about quality and capacity of the wireless channel(s) 107 and the information on quantity and priority of upstream data traffic waiting to be transferred from the remote node(s) 103, 203. In some embodiments, the first receiver 801a is further configured to receive at least part of the upstream data traffic from the radio base station 105 on behalf of the remote node(s) 103, 203. The upstream data traffic may be transmitted from the remote node(s) 103, 203 to the radio base station 105 via the wireless channel(s) 107. In some embodiments, the first receiver 801a is further configured to receive, from the radio base station 105, information 118 about quality and capacity of the plurality of wireless channels(s) 107.

The second receiver 801b may be configured to receive the upstream data traffic from the remote node(s) 103, 203 via the first channel(s) 115, 215.

The first transmitter 805a may be configured to, when at least part of the upstream data traffic or the downstream data traffic is determined to be carried on the wireless channel(s) 107, transmit instructions to the radio base station 105 that the upstream data traffic or the downstream data traffic should be carried on the wireless channel(s) 107. In some embodiments, the first transmitter 805a is further configured to transmit at least part of the downstream data traffic to the radio base station 105 to be further transmitted to the remote node(s) 103, 203 via the wireless channel(s) 107. The first transmitter 805a may be further configured to transmit instructions to the radio base station 105 to awaken the first channel(s) 115, 215 from the sleep mode.

The second transmitter 805b may be further configured to transmit at least part of the downstream data traffic to the remote node(s) 103, 203 via the first channel(s) 115, 215.

The centralized unit 101, 201 comprises a processor 803 configured to, based on the received information and information about availability and capacity of the first channel(s) 115, 215, determine that at least part of the downstream data traffic to the remote node(s) 103, 203 and/or at least part of the upstream data traffic from the remote node(s) 103, 203 should be carried on the wireless channel(s) 107 or the plurality of first channel(s) 115, 215. In some embodiments, the processor 703 is further configured to, when at least part of the upstream data traffic or the downstream data traffic is determined to be carried on the first channel(s) 115, 215, determine to awaken the first channel(s) 115, 215 from a sleep mode. The processor 803 may be further configured to obtain information about the availability and capacity of the first channel(s) 115, 215. In some embodiments, the processor 803 is further configured to determine that at least part of the downstream data traffic to the remote node(s) 103, 203 and/or the upstream data traffic from the remote node(s) 103, 203 should be carried on the wireless channel(s) 107 or the first channel(s) 115, 215, further based on information about availability and capacity of the plurality of first channels 115, 215. The evaluation and decision function 305 shown in FIGS. 3 and 4 is comprised in the processor 803.

Bear in mind that the communications channel 110 is present between the centralized unit 101, 201 and the radio base station 105 even though it is not explicitly discussed above. The communications channel 110 enables the centralized unit 101, 201 and the radio base station 105 to exchange information, instructions and data traffic.

The centralized unit 101, 201 may further comprise a memory 810 comprising one or more memory units. The memory 810 may also be referred to as a computer readable memory 810. The memory 810 is arranged to be used to store data, received data streams, power level measurements, threshold values, time periods, configurations, schedulings, information about quality and capacity of the wireless channel(s) 107 and information on quantity and priority of upstream data traffic waiting to be transferred from the remote node(s) 103, 203 to the centralized unit 101, 201, information about the availability and capacity of the first channel(s) 115, 215, decisions, instructions, transmission grant, upstream data traffic, downstream data traffic, awake instructions and computer program(s) to perform the methods herein when being executed in the centralized unit 101, 201.

Those skilled in the art will also appreciate that the first receiver 801a, the second receiver 801b, the first transmitter 805a and the second transmitter 805b described above may refer to a combination of analog and digital circuits, and/or one or more processors configured with software and/or firmware, e.g. stored in the memory 810, that when executed by the one or more processors such as the processor 803 perform as described above.

In FIG. 8, the dotted boxes illustrates to which network node the entities in the centralized unit 101, 201 communicates with.

The present mechanism for handling data traffic in a communications network 100, 200 may be implemented through one or more processors, such as the processor 703 in the radio base station 105 depicted in FIG. 7 and the processor 803 in the centralized unit 101, 201 depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or micro processor.

The program code mentioned above may also be provided as a computer program(s), for instance in the form of a data carrier, e.g. the memory 710 and/or the memory 810, carrying computer program code with instructions for performing the embodiments herein when being loaded into the radio base station 105 and/or centralized unit 101, 201. One such carrier may be in the form of a CD ROM disc. It is however feasible with other data carriers such as a memory stick. The computer program code may furthermore be provided as pure program code on a server and downloaded to the radio base station 105 and/or centralized unit 101, 201, or factory-programmed into non-volatile memory devices.

The computer program stored in the computer readable memory 710 in the radio base station 105 arranged to handle data traffic in a communications network 100, 200 comprises instruction sets for:

receiving, from the remote node 103, 203 information about quality and capacity of the wireless channel 107 and information on quantity and priority of upstream data traffic waiting to be transferred from the remote node 103, 203 to the centralized unit 101, 201; and based on the received information, determining that at least part of the upstream data traffic from the remote node 103, 203 should be carried on the wireless channel 107.

In some embodiments, the computer program stored in the computer readable memory 710 in the radio base station 105 comprises further instruction sets for:

receiving instructions from the centralized unit 101, 201 that at least part of the upstream data traffic should be scheduled on the wireless channel 107;

determining that the upstream data traffic should be carried on the wireless channel 107 further based on the received instructions;

forwarding, to the centralized unit 101, 201 the received information about quality and capacity of the wireless channel 107 and the information on quantity and priority of upstream data traffic waiting to be transferred from the remote node 103, 203, enabling the centralized unit 101, 201 to determine that at least part of the upstream data traffic should be carried on the wireless channel 107;

transmitting, to the remote node 103, 203, a transmission grant indicating that at least part of the upstream data traffic from the remote node 103, 203 to the centralized unit 101, 201 should be carried on the wireless channel 107;

receiving the upstream data traffic from the remote node 103, 203 via the wireless channel 107;

forwarding the received upstream data traffic to the centralized unit 101, 201 on behalf of the remote node 103, 203;

receiving downstream data traffic from a centralized unit 101, 201 to be carried on the wireless channel 107 to the remote node 103, 203;

transmitting the received downstream data traffic to the remote node 103, 203 via the wireless channel 107;

receiving instructions from the centralized unit 101, 201 to awaken the first channel 115, 215 from a sleep mode;

based on received awake instructions, transmitting, via the wireless channel 107, the instructions to the remote node 103, 203 to awaken the first channel 115, 215.

determining that at least part of the upstream data traffic from the remote node 103, 203 should be carried on the wireless channel 107 further based on the received information about quality and capacity of the plurality of wireless channels 107; and instruction sets for forwarding, to the centralized unit 101, 201, of the received information further comprising forwarding the information 118 about quality and capacity of the plurality of wireless channels 107.

The computer program stored in the computer readable memory 810 in the centralized unit 101, 201 arranged to handle data traffic in a communications network 100, 200 comprises instruction sets for:

receiving, from the radio base station 105 information about quality and capacity of the wireless channel 107 and information on quantity and priority of upstream data traffic waiting to be transferred from the remote node 103, 203; and based on the received information and information about availability and capacity of the first channel 115, 215, determining that at least part of the downstream data traffic to the remote node 103, 203 and/or least part of the upstream data traffic from the remote node 103, 203 should be carried on the wireless channel 107 or the first channel 115, 215.

In some embodiments, the computer program stored in the computer readable memory 810 in the centralized unit 101, 201 comprises further instructions sets for:

when at least part of the upstream data traffic or the downstream data traffic is determined to be carried on the wireless channel 107, transmitting instructions to the radio base station 105 that the upstream data traffic or the downstream data traffic should be carried on the wireless channel 107;

receiving the upstream data traffic from the remote node 103, 203, which upstream data traffic is transmitted from the remote node 103, 203 to the radio base station 105 via the wireless channel 107 and forwarded by the radio base station 105 on behalf of the remote node 103, 203;

transmitting the downstream data traffic to the radio base station 105 to be further transmitted to the remote node 103, 203 via the wireless channel 107;

when at least part of the upstream data traffic or the downstream data traffic is determined to be carried on the first channel 115, 215, determining to awaken the first channel 115, 215 from a sleep mode;

transmitting instructions to the radio base station 105 to awaken the first channel 115, 215 from the sleep mode;

receiving the upstream data traffic from the remote node 103, 203 via the first channel 115, 215;

transmitting the downstream data traffic to the remote node 103, 203 via the first channel 115, 215;

obtaining information about the availability and capacity of the first channel 115, 215;

receiving, from the radio base station 105 information about quality and capacity of the wireless channel 107 and the information on quantity and priority of upstream data traffic waiting to be transferred from the remote node further comprising information 118 about quality and capacity of the plurality of wireless channels 107; and instruction sets for determining that at least part of the downstream data traffic to the remote node 103, 203 and/or the upstream data traffic from the remote node 103, 203 should be carried on the wireless channel 107 or the first channel 115, 215, further based on information about availability and capacity 118 of the plurality of first channels 115, 215.

The embodiments herein are not limited to the above described embodiments. Various alternatives, modifications and equivalents may be used. Therefore, the above embodiments should not be taken as limiting the scope of the embodiments, which is defined by the appended claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a radio base station for handling data traffic in a communications network, wherein the radio base station is connected to a remote node via a wireless channel, wherein the remote node is connected to a centralized unit via a first channel, and wherein the data traffic between the remote node and the centralized unit may be carried on either the wireless channel or the first channel, the method comprising:
   receiving, from the remote node, information about quality and capacity of the wireless channel and information on quantity and priority of upstream data traffic waiting to be transferred from the remote node to the centralized unit;
   based on the received information, determining that at least a part of the upstream data traffic from the remote node to the centralized unit should be carried on the wireless channel using the radio base station as a relay node; and
   forwarding, to the centralized unit, the received information about quality and capacity of the wireless channel and the information on quantity and priority of upstream data traffic waiting to be transferred from the remote node,
   wherein the upstream data traffic is carried on the wireless channel based on the determination, and
   wherein the remote node is represented by an Optical Network Unit (ONU), a Digital Subscriber Line Access Multiplexer (DSLAM), or a radio terminal; and wherein the centralized unit is represented by an Optical Line Terminal (OLT) or an aggregation switch.

2. The method according to claim 1, further comprising: receiving instructions from the centralized unit that at least part of the upstream data traffic should be scheduled on the wireless channel; wherein the determining that the upstream data traffic should be carried on the wireless channel is further based on the received instructions.

3. The method according to claim 1, further comprising: transmitting, to the remote node, a transmission grant indicating that at least part of the upstream data traffic from the remote node to the centralized unit should be carried on the wireless channel;
   receiving the upstream data traffic from the remote node via the wireless channel; and
   forwarding the received upstream data traffic to the centralized unit on behalf of the remote node.

4. The method according to claim 1, further comprising: receiving downstream data traffic from the centralized unit to be carried on the wireless channel to the remote node; and
   transmitting the received downstream data traffic to the remote node via the wireless channel.

5. The method according to claim 1, wherein the method further comprises:
   receiving instructions from the centralized unit to awaken the first channel from a sleep mode; and
   based on received awake instructions, transmitting, via the wireless channel, the instructions to the remote node to awaken the first channel.

6. The method according to claim 1, wherein the radio base station is connected to a plurality of remote nodes via a plurality of wireless channels, wherein the data traffic between the plurality of remote nodes and the centralized unit may be carried on either of the plurality of wireless channels or a plurality of first channels, and wherein the receiving, from the remote node, the information about quality and capacity of the wireless channel and the information on quantity and priority of upstream data traffic waiting to be transferred from the remote node to the centralized unit further comprises information from the plurality of remote nodes;
   wherein the determining that at least part of the upstream data traffic from the remote node should be carried on the wireless channel is further based on the received information about quality and capacity of the plurality of wireless channels; and wherein the forwarding, to the centralized unit, of the received information further comprises forwarding the information about quality and capacity of the plurality of wireless channels.

7. The method according to claim 1, wherein at least part of the first channel is a wireless channel or a wireline channel; wherein the wireline channel is represented by an optical fibre channel, a Digital Subscriber Line (DSL) or a point-to-point fibre channel; and wherein the wireless channel is represented by a microwave channel.

8. A method in a centralized unit for handling data traffic in a communications network, wherein the centralized unit is connected to a remote node via a first channel, wherein the centralized unit is connected to a radio base station, which radio base station is connected to the remote node via a wireless channel, and wherein the data traffic between the remote node and the centralized unit may be carried over either the wireless channel or the first channel, the method comprising:
   receiving, from the radio base station, information about quality and capacity of the wireless channel and information on quantity and priority of upstream data traffic waiting to be transferred from the remote node; and
   based on the received information and information about availability and capacity of the first channel, determining that at least part of a downstream data traffic to the remote node and/or at least part of the upstream data traffic from the remote node should be carried on the wireless channel using the radio base station as a relay node or on the first channel,
   wherein the upstream data traffic is carried on the wireless channel based on the determination, and
   wherein the remote node is represented by an Optical Network Unit (ONU), a Digital Subscriber Line Access Multiplexer (DSLAM), or a radio terminal; and wherein the centralized unit is represented by an Optical Line Terminal (OLT) or an aggregation switch.

9. The method according to claim 8, further comprising:
when at least part of the upstream data traffic or the downstream data traffic is determined to be carried on the wireless channel, transmitting instructions to the radio base station that the upstream data traffic or the downstream data traffic should be carried on the wireless channel; and
receiving the upstream data traffic from the remote node, wherein the upstream data traffic is transmitted from the remote node to the radio base station via the wireless channel and forwarded by the radio base station on behalf of the remote node; or
transmitting the downstream data traffic to the radio base station to be further transmitted to the remote node via the wireless channel.

10. The method according to claim 8, further comprising:
when at least part of the upstream data traffic or the downstream data traffic is determined to be carried on the first channel, determining to awaken the first channel from a sleep mode;
transmitting instructions to the radio base station to awaken the first channel from the sleep mode; and
receiving the upstream data traffic from the remote node via the first channel; or
transmitting the downstream data traffic to the remote node via the first channel.

11. The method according to claim 8, further comprising:
obtaining information about the availability and capacity of the first channel.

12. The method according to claim 8, wherein the radio base station is connected to a plurality of remote nodes via a plurality of wireless channels; wherein the data traffic between the plurality of remote nodes and the centralized unit may be carried on either the plurality of wireless channels or the first channel; and wherein the receiving, from the radio base station, the information about quality and capacity of the wireless channel and the information on quantity and priority of upstream data traffic waiting to be transferred from the remote node further comprises information about quality and capacity of the plurality of wireless channels.

13. The method according to claim 8, wherein the centralized unit is connected to a plurality of remote nodes via a plurality of first channels; wherein the data traffic between the plurality of remote nodes and the centralized unit may be carried on either the plurality of wireless channels or the plurality of first channels; and wherein the determining that at least part of the downstream data traffic to the remote node and/or the upstream data traffic from the remote node should be carried on the wireless channel or on the first channel is further based on information about availability and capacity of the plurality of first channels.

14. The method according to claim 8, wherein at least part of the first channel is a wireless channel or a wireline channel; wherein the wireline channel is represented by an optical fibre channel, a Digital Subscriber Line (DSL), or a point-to-point fibre channel; and wherein the wireless channel is represented by a microwave channel.

15. A radio base station for handling data traffic in a communications network, wherein the radio base station is arranged to be connected to a remote node via a wireless channel, and wherein the remote node is arranged to be connected to a centralized unit via a first channel, and wherein the data traffic between the remote node and the centralized unit may be carried on either the wireless channel or the first channel, the radio base station comprising:
a first receiver configured to receive, from the remote node, information about quality and capacity of the wireless channel and information on quantity and priority of upstream data traffic waiting to be transferred from the remote node to the centralized unit; and
a processor configured to, based on the received information, determine that at least a part of the upstream data traffic from the remote node to the centralized unit should be carried on the wireless channel using the radio base station as a relay node,
wherein the upstream data traffic is carried on the wireless channel based on the determination, and
wherein the remote node is represented by an Optical Network Unit (ONU), a Digital Subscriber Line Access Multiplexer (DSLAM), or a radio terminal, and wherein the centralized unit is represented by an Optical Line Terminal (OLT) or an aggregation switch.

16. The radio base station according to claim 15, further comprising:
a second receiver configured to receive instructions from the centralized unit that at least part of the upstream data traffic should be scheduled on the wireless channel; and wherein the processor is further configured to determine that at least part of the upstream data traffic should be carried on the wireless channel further based on the received instructions.

17. The radio base station according to claim 15, further comprising:
a second transmitter configured to forward, to the centralized unit, the received information about quality and capacity of the wireless channel and the information on quantity and priority of upstream data traffic waiting to be transferred from the remote node, enabling the centralized unit to determine that at least part of the upstream data traffic should be carried on the wireless channel.

18. The radio base station according to claim 15, further comprising:
a first transmitter configured to transmit, to the remote node, a transmission grant indicating that at least part of the upstream data traffic from the remote node to the centralized unit should be carried on the wireless channel; and wherein
the first receiver is further configured to receive the at least part of the upstream data traffic from the remote node via the wireless channel; and wherein the radio base station further comprises:
a second transmitter configured to forward the at least part of the received upstream data traffic to the centralized unit on behalf of the remote node.

19. The radio base station according to claim 15, further comprising:
a second receiver configured to receive downstream data traffic from the centralized unit to be carried on the wireless channel to the remote node; and
a first transmitter configured to transmit the received downstream data traffic to the remote node via the wireless channel.

20. The radio base station according to claim 15, further comprising:
a second receiver configured to receive instructions from the centralized unit to awaken the first channel; and
a first transmitter configured to, based on received awake instructions, transmit, via the wireless channel, the instructions to the remote node to awaken the first channel.

21. The radio base station according to claim 15, wherein the radio base station is arranged to be connected to a plurality of remote nodes via a plurality of wireless channels; wherein the data traffic between the plurality of remote nodes and the centralized unit may be carried on either the plurality of wireless channels or a plurality of first channels, and wherein
  the first receiver is further configured to receive, from the plurality of remote nodes, information about quality and capacity of the plurality of wireless channels and information on quantity and priority of upstream data traffic waiting to be transferred from the plurality of remote nodes to the centralized unit;
  the processor is further configured to determine that at least part of the upstream data traffic from the remote node should be carried on the wireless channel further based on the received information about quality and capacity of the plurality of wireless channels and the information on quantity and priority of upstream data traffic waiting to be transferred from the plurality of remote nodes to the centralized unit; and
  a second transmitter is further configured to forward the information about quality and capacity of the plurality of wireless channels to the centralized unit.

22. The radio base station according to claim 15, wherein at least part of the first channel is a wireless channel or a wireline channel; wherein the wireline channel is represented by an optical fibre channel, a Digital Subscriber Line (DSL), or a point-to-point fibre channel; and wherein the wireless channel is represented by a microwave channel.

23. A centralized unit for handling data traffic in a communications network, wherein the centralized unit is arranged to be connected to a remote node via a first channel, wherein the centralized unit is arranged to be connected to a radio base station, which radio base station is arranged to be connected to the remote node via a wireless channel, and wherein the data traffic between the remote node and the centralized unit may be carried over either the wireless channel or the first channel, the centralized unit comprising:
  a first receiver configured to receive, from the radio base station, information about quality and capacity of the wireless channel and information on quantity and priority of upstream data traffic waiting to be transferred from the remote node; and
  a processor configured to, based on the received information and information about availability and capacity of the first channel, determine that at least part of downstream data traffic to the remote node and/or at least part of the upstream data traffic from the remote node should be carried on the wireless channel using the radio base station as a relay node or on the first channel,
  wherein the upstream data traffic is carried on the wireless channel based on the determination, and
  wherein the remote node is represented by an Optical Network Unit (ONU), a Digital Subscriber Line Access Multiplexer (DSLAM), or a radio terminal, and wherein the centralized unit is represented by an Optical Line Terminal (OLT) or an aggregation switch.

24. The centralized unit according to claim 23, further comprising:
  a first transmitter configured to, when at least part of the upstream data traffic or the downstream data traffic is determined to be carried on the wireless channel, transmit instructions to the radio base station that the upstream data traffic or the downstream data traffic should be carried on the wireless channel; and
  wherein the first receiver is further configured to receive at least part of the upstream data traffic from the radio base station on behalf of the remote node, wherein the upstream data traffic is transmitted from the remote node to the radio base station via the wireless channel; or
  wherein the first transmitter is further configured to transmit at least part of the downstream data traffic to the radio base station to be further transmitted to the remote node via the wireless channel.

25. The centralized unit according to claim 23, wherein the processor is further configured to, when at least part of the upstream data traffic or the downstream data traffic is determined to be carried on the first channel, determine to awaken the first channel from a sleep mode; wherein the centralized unit further comprises:
  a first transmitter configured to transmit instructions to the radio base station to awaken the first channel from the sleep mode;
  a second receiver configured to receive the upstream data traffic from the remote node via the first channel; and
  a second transmitter configured to transmit at least part of the downstream 15 data traffic to the remote node via the first channel.

26. The centralized unit according to claim 23, wherein the processor is further configured to obtain information about the availability and capacity of the first channel.

27. The centralized unit according to claim 23, wherein the radio base station is arranged to be connected to a plurality of remote nodes via a plurality of wireless channels, wherein the data traffic between the plurality of remote nodes and the centralized unit may be carried on either the plurality of wireless channels or the plurality of first channels; and wherein the first receiver is further configured to receive, from the radio base station, information about quality and capacity of the plurality of wireless channels.

28. The centralized unit according to claim 23, wherein the centralized unit is arranged to be connected to a plurality of remote nodes via a plurality of first channels, wherein the data traffic between the plurality of remote nodes and the centralized unit may be carried on either the plurality of wireless channels or the plurality of first channels; and wherein the processor is further configured to determine that at least part of the downstream data traffic to the remote node and/or the upstream data traffic from the remote node should be carried on the wireless channel or on the first channel further based on information about availability and capacity of the plurality of first channels.

29. The centralized unit according to claim 23, wherein at least part of the first channel is a wireless channel or a wireline channel; wherein the wireline channel is represented by an optical fibre channel, a Digital Subscriber Line (DSL), or a point-to-point fibre channel; and wherein the wireless channel is represented by a microwave channel.

30. A computer program stored in a non-transitory computer readable memory in a radio base station for handling data traffic in a communications network, wherein the radio base station is arranged to be connected to a remote node via a wireless channel, and wherein the remote node is arranged to be connected to a centralized unit via a first channel, and wherein the data traffic between the remote node and the centralized unit is arranged to be carried on either the wireless channel or the first channel, the computer program comprising instruction sets for:
  receiving, from the remote node, information about quality and capacity of the wireless channel and information on quantity and priority of upstream data traffic waiting to be transferred from the remote node to the centralized unit; and based on the received information, determining that at least part of the upstream data traffic from the remote node to the centralized unit should be carried on the wireless channel using the radio base station as a relay node, wherein the upstream data traffic is carried on the wireless channel based on the determination, and wherein the remote node is represented by an Optical Network Unit (ONU), a Digital Subscriber Line Access Multiplexer (DSLAM), or a radio terminal, and wherein the centralized unit is represented by an Optical Line Terminal (OLT) or an aggregation switch.

31. A computer program stored in a non-transitory computer readable memory in a centralized unit for handling data traffic in a communications network, wherein the centralized unit is arranged to be connected to a remote node via a first channel, wherein the centralized unit is arranged to be connected to a radio base station, which radio base station is arranged to be connected to the remote node via a wireless channel, and wherein the data traffic between the remote node and the centralized unit is arranged to be carried over either the wireless channel or the first channel, the computer program comprising instruction sets for:

receiving, from the radio base station, information about quality and capacity of the wireless channel and information on quantity and priority of upstream data traffic waiting to be transferred from the remote node; and based on the received information and information about availability and capacity of the first channel, determining that at least part of downstream data traffic to the remote node and/or at least part of the upstream data traffic from the remote node should be carried on the wireless channel using the radio base station as a relay node or on the first channel, wherein the upstream data traffic is carried on the wireless channel based on the determination, and wherein the remote node is represented by an Optical Network Unit (ONU), a Digital Subscriber Line Access Multiplexer (DSLAM), or a radio terminal, and wherein the centralized unit is represented by an Optical Line Terminal (OLT) or an aggregation switch.

\* \* \* \* \*